US012694036B2

(12) United States Patent　　　　(10) Patent No.: US 12,694,036 B2
Bandoni et al.　　　　　　　　　　　(45) Date of Patent: Jul. 28, 2026

(54) SYSTEMS AND METHODS FOR DATA MATCHING AND VISUALIZATION

(71) Applicant: Tagetik Software S.r.l., Lucca (IT)

(72) Inventors: Letizia Bandoni, Lucca (IT); Claudia Busdraghi, Cecina (IT); Francesco Morini, Busto Arsizio (IT); Claudia Bacci, Lucca (IT); Lorenzo Ferri, Porto Recanati (IT)

(73) Assignee: Tagetik Software S.r.l, Lucca (IT)

( * ) Notice: Subject to any disclaimer, the term of this patent is extended or adjusted under 35 U.S.C. 154(b) by 0 days.

(21) Appl. No.: 18/979,105

(22) Filed: Dec. 12, 2024

(65) Prior Publication Data

US 2026/0169998 A1　　Jun. 18, 2026

(51) Int. Cl.
G06F 16/248　　(2019.01)
G06F 16/2452　　(2019.01)

(52) U.S. Cl.
CPC ...... G06F 16/248 (2019.01); G06F 16/24522 (2019.01)

(58) Field of Classification Search
None
See application file for complete search history.

(56) References Cited

U.S. PATENT DOCUMENTS

| | | |
|---|---|---|
| 11,030,207 B1 | 6/2021 | Setlur et al. |
| 12,561,348 B2 * | 2/2026 | Yang ..................... G06F 16/322 |
| 12,561,473 B1 * | 2/2026 | So ....................... G06F 21/6227 |

| | | | |
|---|---|---|---|
| 2024/0378236 A1 * | 11/2024 | Kharbanda | ....... G06F 16/33295 |
| 2025/0298583 A1 * | 9/2025 | Carrara | ..................... G06F 8/31 |
| 2025/0298584 A1 * | 9/2025 | Carrara | ..................... G06F 8/30 |
| 2025/0298585 A1 * | 9/2025 | Carrara | .............. G06N 3/0475 |
| 2025/0298586 A1 * | 9/2025 | Carrara | ..................... G06F 8/71 |
| 2025/0315430 A1 * | 10/2025 | Xu | ........................... G06F 40/35 |
| 2025/0335433 A1 * | 10/2025 | Kulkarni | .......... G06F 16/24522 |
| 2025/0335434 A1 * | 10/2025 | Chen | .................. G06F 16/2255 |
| 2025/0335477 A1 * | 10/2025 | Wen | ..................... G06F 16/383 |

(Continued)

FOREIGN PATENT DOCUMENTS

| | | |
|---|---|---|
| CN | 118820420 A | 10/2024 |

OTHER PUBLICATIONS

Prompting is Programming: A Query Language for Large Language Models (Year: 2023).*

(Continued)

*Primary Examiner* — Kim T Nguyen
(74) *Attorney, Agent, or Firm* — Morgan, Lewis & Bockius LLP

(57)　　　　ABSTRACT

Systems and methods for generating user interfaces including automatically generated visual interface elements and linkages are disclosed. A data request including a first natural language prompt is received and is converted to a query in a predetermined query language using a first model. A data search is executed based on the query and at least one visual interface element template is identified based on the query using a second model. A visual interface element is generated using a visual generation process that receives the data search and the template. An interface is generated including the visual interface element and a source request is received. A trained source identification model identifies source of a data element and updates the interface to include an interface element representative of the source.

20 Claims, 22 Drawing Sheets

(56) References Cited

U.S. PATENT DOCUMENTS

| | | | |
|---|---|---|---|
| 2025/0335715 A1* | 10/2025 | Kumaresan ....... | G06F 16/24522 |
| 2025/0335718 A1* | 10/2025 | Wen ........................ | G06F 40/40 |
| 2025/0335723 A1* | 10/2025 | Wen ........................ | G06F 40/40 |
| 2025/0337707 A1* | 10/2025 | Wen ........................ | H04L 51/02 |
| 2026/0004071 A1* | 1/2026 | Weisz ................... | G06F 40/284 |
| 2026/0044495 A1* | 2/2026 | Rughwani ............. | G06F 16/243 |
| 2026/0050603 A1* | 2/2026 | Abbas ................. | G06F 16/2465 |

OTHER PUBLICATIONS

Tagetik Software S.R.L, PCTIB2025062116, International Search Report & Written Opinion, Feb. 23, 2026, the whole document.
Song Yuanfeng et al: "Marrying Dialogue 1-20 Systems with Data Visualization: Interactive Data Visualization Generation from Natural Language Conversations" Proceedings of the 55TH Annual IEEE/ACM International Symposium On Microarchitecture, ACMPUB27, New York, NY, USA, Aug. 25, 2024 (Aug. 25, 2024), pp. 2733-2744.

* cited by examiner

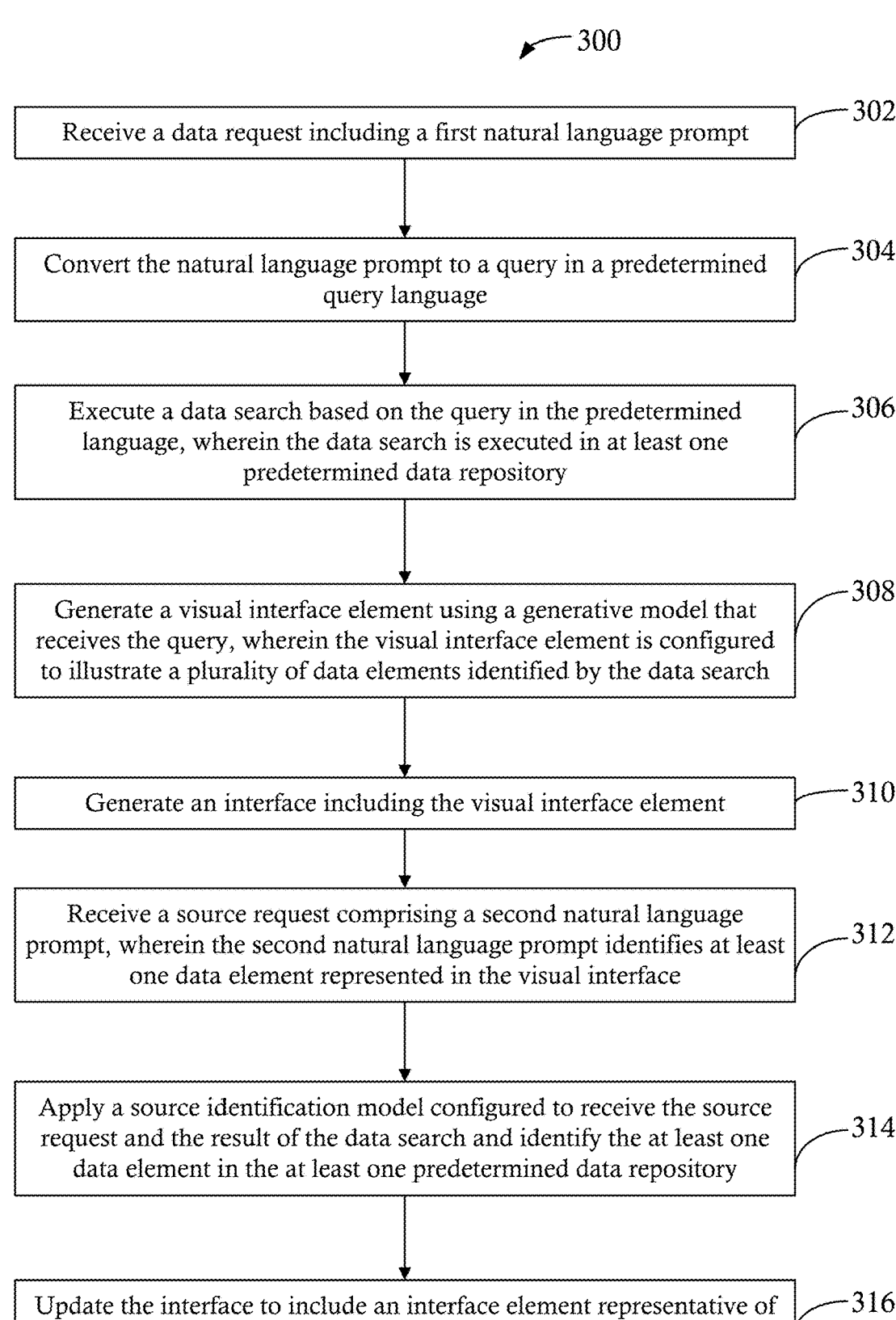

┌─── 300

| Receive a data request including a first natural language prompt | ─── 302 |

| Convert the natural language prompt to a query in a predetermined query language | ─── 304 |

| Execute a data search based on the query in the predetermined language, wherein the data search is executed in at least one predetermined data repository | ─── 306 |

| Generate a visual interface element using a generative model that receives the query, wherein the visual interface element is configured to illustrate a plurality of data elements identified by the data search | ─── 308 |

| Generate an interface including the visual interface element | ─── 310 |

| Receive a source request comprising a second natural language prompt, wherein the second natural language prompt identifies at least one data element represented in the visual interface | ─── 312 |

| Apply a source identification model configured to receive the source request and the result of the data search and identify the at least one data element in the at least one predetermined data repository | ─── 314 |

| Update the interface to include an interface element representative of the output of the trained source identification model. | ─── 316 |

FIG. 3

SYSTEMS AND METHODS FOR DATA MATCHING AND VISUALIZATION

TECHNICAL FIELD

This application relates generally to interactive systems for data management, and more specifically to a data matching and visualizing platform for users of varying degrees of functional and technical skills.

BACKGROUND

Data access for non-technical professionals is often locked by system sophistication and data intricacy. For example, finance professionals may spend up to 78% of their time accessing data, identifying data relevancy and interconnection, preparing for analysis, and investigating the data for greater insight. Although greater data access assists non-technical professionals with informed decision making, effective risk management, and/or developing strategic plans, current systems do not enable effective data access for users without the required technical sophistication.

Some present data retrieval systems require knowledge of specialized retrieval languages, such as the SQL query language. In addition, some present data retrieval systems fail to account for data in various disparate data repositories. The complexity of certain search syntax, storage hierarchies, and/or required knowledge base for current solutions, coupled with a lack of functional expertise, often results in failure to identify relevant data.

SUMMARY

In various embodiments, a computer-implemented method for generating user interfaces including automatically generated visual interface elements is disclosed. The computer-implemented method includes steps of receiving a data request including a first natural language prompt; in response to receiving the data request, converting the natural language prompt to a query in a predetermined query language; executing a data search based on the query in the predetermined language, wherein the data search is executed in at least one predetermined data repository; and generating a visual interface element using at least one generative model that receives the converted query and generates a configuration object. The visual interface element is generated based on the configuration object and the query results to illustrate a plurality of data elements identified by the data search. The computer-implemented method further includes steps of generating an interface including the visual interface element.

In various embodiments, a system for generating user interfaces including automatically generated visual interface elements. The system includes a non-transitory memory and a processor communicatively coupled to the non-transitory memory. The processor is configured to read a set of instructions to receive a data request including a first natural language prompt; in response to receiving the data request, convert the natural language prompt to a query in a predetermined query language; execute a data search based on the query in the predetermined language, wherein the data search is executed in at least one predetermined data repository; and generate a visual interface element using at least one generative models that receives the converted query and generates a configuration object. The visual interface element is generated based on the configuration object and the query results to illustrate a plurality of data elements identified by the data search. The processor is further configured to read the instructions to generate an interface including the visual interface element.

In various embodiments, a non-transitory computer readable medium having instructions stored thereon is disclosed. The instructions, when executed by at least one processor, cause at least one device to perform operations including receiving a data request including a first natural language prompt; in response to receiving the data request, converting the natural language prompt to a query in a predetermined query language; executing a data search based on the query in the predetermined language, wherein the data search is executed in at least one predetermined data repository; and generating a visual interface element using at least one generative model that receives the converted query and generates a configuration object. The visual interface element is generated based on the configuration object and the query results to illustrate a plurality of data elements identified by the data search. The instructions cause the device to further perform operations including generating an interface including the visual interface element.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 3 is a flowchart illustrating a method of automatically generating interface elements based on natural language prompts for domain-specific data, in accordance with some embodiments;

DETAILED DESCRIPTION

Figure 1:
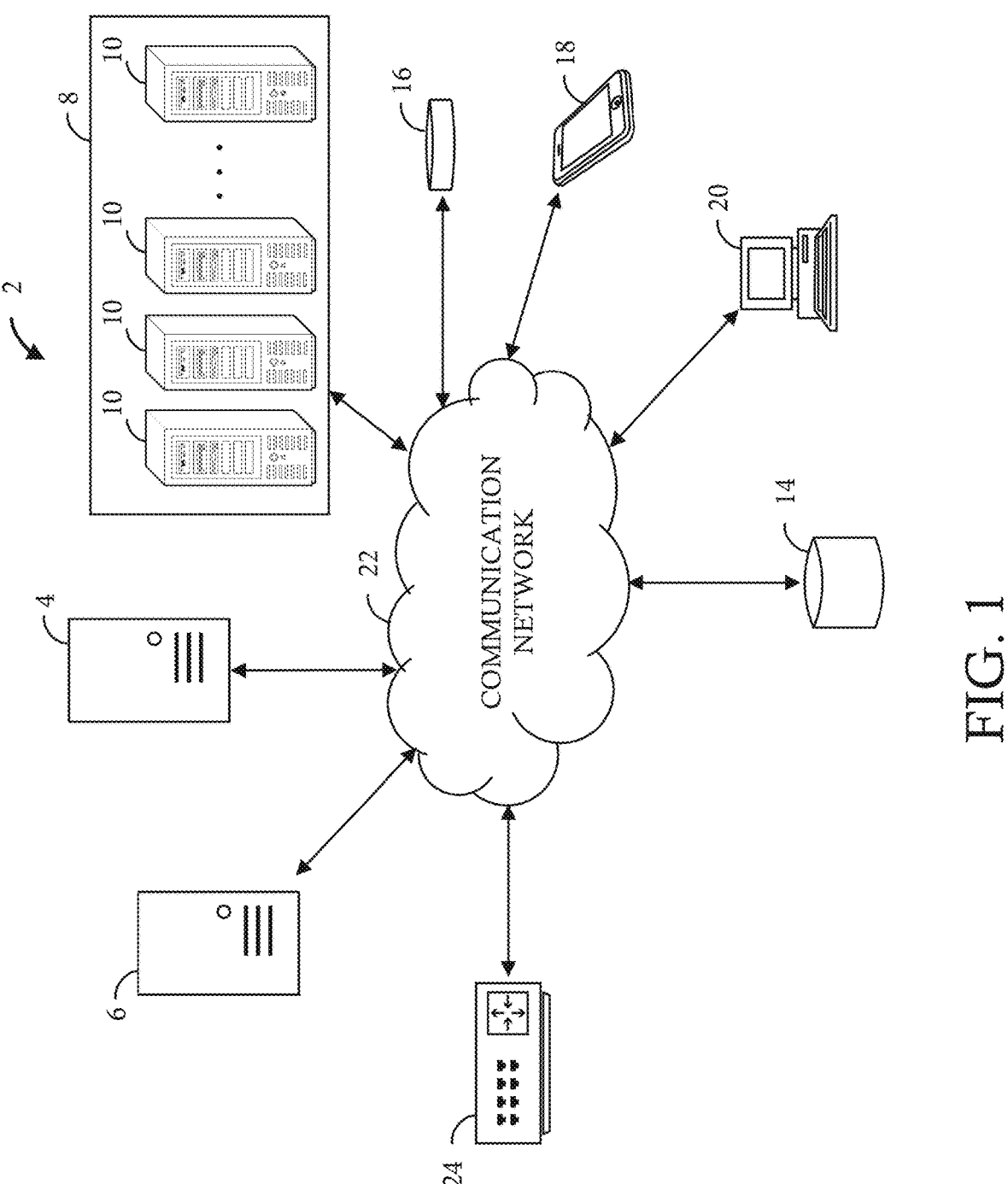
FIG. 1 illustrates a network environment for data matching, visualization, and system navigation, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

The systems and methods described herein were created to meet compliance requirements for the measure. Prior to the existence of the present disclosure, there was no technically inclusive finance data matching and visualization platform for accessing information such as sales revenue by region, contribution margins, product comparison, and/or sales segmentation reports. As disclosed herein, finance data, including product and/or sales data, is shared digitally in near-real time with an external system, e.g., an Event Driven Architecture ("EDA") based system, that may be controlled by a Natural Language Processing (NLP) unit, a Large Language Model ("LLM") technology, and/or Generative AI ("GenAI") technology. The use of LLM and GenAI technology allows the DatAInsight machine-trained platform to translate the user's request and match it based on the system's feedback loop to find the right content to solve the user's need. Although the term "platform" is used herein, it will be understood that the disclosed systems and methods may be integrated into a larger software environment (e.g., a larger platform) that provides complimentary, additional, alternative, or unrelated tools, functions, or processes. The discloses systems and methods may be provided as one tool within the larger platform to enable multiple functions to be performed through a single integrated platform.

Embedded generative AI technology allows the system to generate digital models of the requested financial data. The digital models may be in the form of charts, reports, and/or graphs. Charts and graphs may include bar charts, line charts, pie charts, scatter plots, histograms, bubble charts, treemaps, and/or box plots. Machine learning modules in conjunction with a Natural Language Processing unit allow the system to interpret user-inputted requests and generate accurate responses based on the request. This function also allows users to access complex data through the use of plain language. Therefore, the process of accessing financial data is not dependent on the user's functionality or skill and is instead a streamlined system for software navigation and/or data visualization. The disclosed systems and methods provide an access point for data visualization and navigation through a safe and secure integration with generative models to provide actionable summaries or interfaces to a user. The disclosed systems and methods further provide a flexible architecture that allow for the platform or user to seamlessly switch between available generative models.

The financial data visualization platform may enable a user to save time when needing ad-hoc reports/dashboards and/or searching for specific information found in standard reports/dashboards already present in the system. The platform may also provide direct links to data access points such as reports/dashboards and create easy-to-understand visualizations and data representations. The use of plain natural language in the search interface allows users of varying technical expertise to access and visualize financial data.

In some embodiments, the disclosed systems and methods allow a user to address data exploration requests to an application through a natural language input (e.g., voice input, chat input). The disclosed systems and methods convert the received natural language input into a query syntax and leverage generative processes to create one or more forms for exploration of datasets that contain results of the query. Data may be extracted from the datasets and converted to one or more selected data visualizations (e.g., chart, table, dashboard) to display the query results.

Referring to FIG. 1, there is shown a block diagram illustrating an implementation of a network environment for data matching, visualization, and/or system navigation, generally designated 2 and referred to as network environment 2. While some example features are illustrated, various other features have not been illustrated for the sake of brevity and so as not to obscure pertinent aspects of the example embodiments disclosed herein. To that end, as a non-limiting example, the network environment for data visualization may include one or more computing devices in communication with one or more networked servers. The one or more networked servers may share any number of logical units.

In some embodiments, the network environment 2 includes a plurality of devices or systems configured to communicate over one or more network channels, illustrated as a network cloud 22. For example, in various embodiments, the network environment 2 may include, but is not limited to, a data management computing device 4, a web server 6, a cloud-based engine 8 including one or more processing devices 10, a database 14, and/or one or more user computing devices 16, 18, 20 operatively coupled over the network 22. The data management computing device 4, the web server 6, the processing device(s) 10, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the data management computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the data management computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the data management computing device 4, the processing devices 10, and/or the web server 6 are operated by the network environment provider, and the user computing devices 16, 18, 20 are operated by users of the network environment. In some embodiments, the processing devices 10 are operated by a third party (e.g., a cloud-computing provider).

Although FIG. 1 illustrates three user computing devices 16, 18, 20, the network environment 2 may include any number of user computing devices 16, 18, 20. Similarly, the network environment 2 may include any number of the data management computing device 4, the web server 6, the processing devices 10, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the data management computing device 4, the web server 6, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the user computing devices 16, 18, 20 may communicate with the web server 6 over the communication network 22. For example, each of the user computing devices 16, 18, 20 may be operable to view, access, and interact with a website, such as a data retrieval and visualization website, hosted by the web server 6. The web server 6 may transmit user session data related to a user's activity (e.g., interactions) on the website. For example, a user may operate one of the user computing devices 16, 18, 20 to initiate an interactive session, such as a chat-based session or voice-based session, that is directed to the website hosted by the web server 6. The website may capture these activities as user session data, and transmit the user session data to the data management computing device 4 over the communication network 22. The website may also allow the user to interact with one or more of interface elements to perform specific operations, as discussed herein.

In some embodiments, the data management computing device 4 may include an configuration object module 26 and/or a data visualization module 28. The configuration object module 26 may facilitate data interconnection, analysis efficiency, and/or complex data navigation, for example, by executing one or more models, processes, or algorithms, such as a machine learning model, deep learning model, statistical model, etc. to generate a configuration object that includes one or more parameters used by the data visualization module 28 to generate a data visualization. For example, the data visualization model may facilitate generation of visual interface elements representative of summarized financial data and/or source elements based on a configuration object generated by the configuration object module 26. The data management computing device 4 may transmit generated visual interface elements to the web server 6 over the communication network 22, and the web server 6 may display the generated visual interface elements on the website to the user.

In some embodiments, the configuration object module 26 implements a pipeline process to generate a configuration object including application of one or more generative models, such as large language models, and at least one embedding model. For example, in some embodiments, the configuration object module 26 implements a first LLM that receives a natural language user query and converts the natural language query into a language specific query. The language specific query may be provided to a second LLM that utilizes the converted, language specific query to identify eligible visual elements (e.g., charts, measures, dimensions, filters, etc.) for use in data visualization. The selected eligible visual elements may be provided to an embedding model that generates embeddings for each of the visual elements and provides the embeddings to a third LLM that outputs a set of best matching visual elements based on the embeddings. The output of the third LLM may include selected visual element types, parameters, attributes, etc. based on the converted language specific query. The output of the configuration object module may include a configuration object identifying the selected visual element types, parameters, attributes, etc.

The converted language specific query is further provided to the data visualization module 28, which accesses a secure environment to execute the converted query on user specific data. The results of the query are used to populate visual elements based on the configuration object received from the configuration object module 26. By bifurcating the configuration object from query execution and population, the disclosed systems and methods protect user data from being exposed to LLMs or other generative models and maintain user data solely within a secure environment. In addition, the secured environment ensures that search query execution and visualization utilizes only data that is authorized and/or desired to be used by the user.

The data management computing device 4 is further operable to communicate with the database 14 over the communication network 22. For example, the data management computing device 4 may store data to, and read data from, the database 14. The database 14 may be a remote storage device, such as a cloud-based server, a disk (e.g., a hard disk), a memory device on another application server, a networked computer, or any other suitable remote storage. The database 14 may be configured to store domain-specific data, such as, for example, financial data. Although shown remote to the data management computing device 4, in some embodiments, the database 14 may be a local storage device, such as a hard drive, a non-volatile memory, or a USB stick.

In some embodiments, the data management computing device 4 generates training data for a plurality of models (e.g., machine learning models, deep learning models, statistical models, algorithms) based on historical data retrieval requests, query language requirements, historical data retrieval response, and/or any other suitable data. The data management computing device 4 and/or one or more of the processing devices 10 may train one or more models based on corresponding training data. The data management computing device 4 may store the models in a database, such as in the database 14 (e.g., a cloud storage database).

The models, when executed by the data management computing device 4, allow the data management computing device 4 to receive a natural language prompt for a data search, generate a query in a predetermined query language, search a set of predetermined data repositories based on the query, and generate a visual interface element representative of a summarization of the results of the query. The data management computing device 4 may be further configured to receive a source request, implement a source identification machine learning model to select a best-source from the query search results for a specific visualized data element, and generate an interface element representative of the selected best-source.

In some embodiments, the data management computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units.

In some embodiments, the data management computing device receives a user-generated natural language prompt and implements a natural language conversion model via the configuration object module 26 to convert the natural language prompt to a predetermined query language and execute a search. The configuration object module 26 may facilitate data interconnection, analysis efficiency, and/or complex data navigation. A data visualization module 28 may provide data visualization and/or commentary generation. The data visualization module 28 may further streamline the creation of a visualization type that best fits and represents the data requested by the user. In this figure, an example of a request that may be sent by the user includes a prompt of "What's the performance for the entities Rome and Madrid?" In some embodiments, the predetermined query is generated and/or executed by one or more generative models, which may receive enriched prompt inputs generated via a RAG process to facilitate specific use cases or data exploration tasks.

The configuration object module 26 may implement one or more generative models, embedding models, or other trained models to determine and generate a best visualization type for the retrieved data. Examples of visualization types may include a bar chart, line chart, pie chart, histogram, scatter plot, and heat map, among others. For example, a machine learning model, such as a generative model (e.g., a large language model) may determine a "line chart" to be the most appropriate visualization type. Although various embodiments are discussed herein, it will be appreciated that any suitable visualization type may be provided and that a machine learning model 26 may utilize any suitable generative processes and/or fine-tuning to select and/or output a data visualization.

In some embodiments, in response to determining an appropriate visualization type for the requested data, appropriate parameters (e.g., measures, dimensions, filters), etc. to fit the data using the initial natural language prompt and a selected visualization type are selected. Parameters may be user-inputted as names, measures, and/or dimensions. In the context of chart visualizations, "names" "measures" and "dimensions" are terms often used in data analysis and visualization tools like business intelligence software. Names, measures and dimensions may help organize and understand data in charts more effectively. Names may represent labels or identifiers assigned to various elements within the chart. These names help users understand and interpret the data being presented. Examples of names may include axis labels, legend labels, data point labels and chart title. Names in chart visualizations may serve to provide clarity, context, and understanding to viewers by labeling various elements within the chart. Names may help users interpret the data accurately and draw meaningful insights from the visual representation. Measures may represent the numerical data or quantitative values that you want to analyze or visualize. Measures may be numeric and can be aggregated using mathematical functions like sum, average, count, etc. Examples of measures include sales revenue, profit, quantity sold, temperature, among others. Measures may be represented along the axes of a chart (e.g., the y-axis of a bar chart or the values plotted on a line chart). Dimensions may be referred to herein as attributes or categorical variables used to group, categorize, or segment the data. They provide context to the measures and are typically qualitative. Examples of dimensions may include time (date, year, month), geographic location (country, city), product categories, customer segments, etc. Dimensions may be used to enable users to analyze how measures vary across different categories or groups. Dimensions are often represented by the various data points or categories on the x-axis of a chart or used for grouping and coloring data.

Parameters may be in the form of numerical, categorical, temporal, and/or geographical. Numerical parameters may include revenue, expenses, profit, earnings per share, profit margin, assets, liabilities, equity, return on investment, market capitalization, dividend yield, and/or volatility. Categorical parameters may include industry sector, market segment, geographic region, credit rating, investment style, asset class, market exchange, company size, risk level, regulatory compliance, and/or market condition. Temporal parameters may include date, time stamp, fiscal period, time interval, and/or duration. Geographical parameters may include country, region, city, exchange, currency, foreign exchange rate, and/or interest rates by country. For example, the machine learning module may determine, the most appropriate parameters to be Rome/Madrid, product sales, and actuals based off a user request. In some embodiments, the parameters are provided as part of and/or in the form of a prompt for a generative model. The prompt may provide specific structure to the generative model for processing of specific use cases and/or data exploration tasks.

In some embodiments, and in response to determining the appropriate parameters to fit the user-requested data, a third request may be sent to the data visualization module 28. The third request may be used to match the visualization type and the parameters with a database stored system language. This matching process enables the user to input requests in plain language, as the data visualization module may then translate the request to match the format of the data stored in the database. The data visualization module may then use the visualization type and parameters to identify and match the correct data stored in the database to then generate the visualization result.

In some embodiments, and in response to the data visualization module 108 identifying and matching the user request to the format of the data stored in the database, the visualization may then be generated and sent back to the user. A response may be generated representing a visual interface element, such as a line chart comparing one or more parameters. The response may be sent to a client device 16.

Figure 2A:
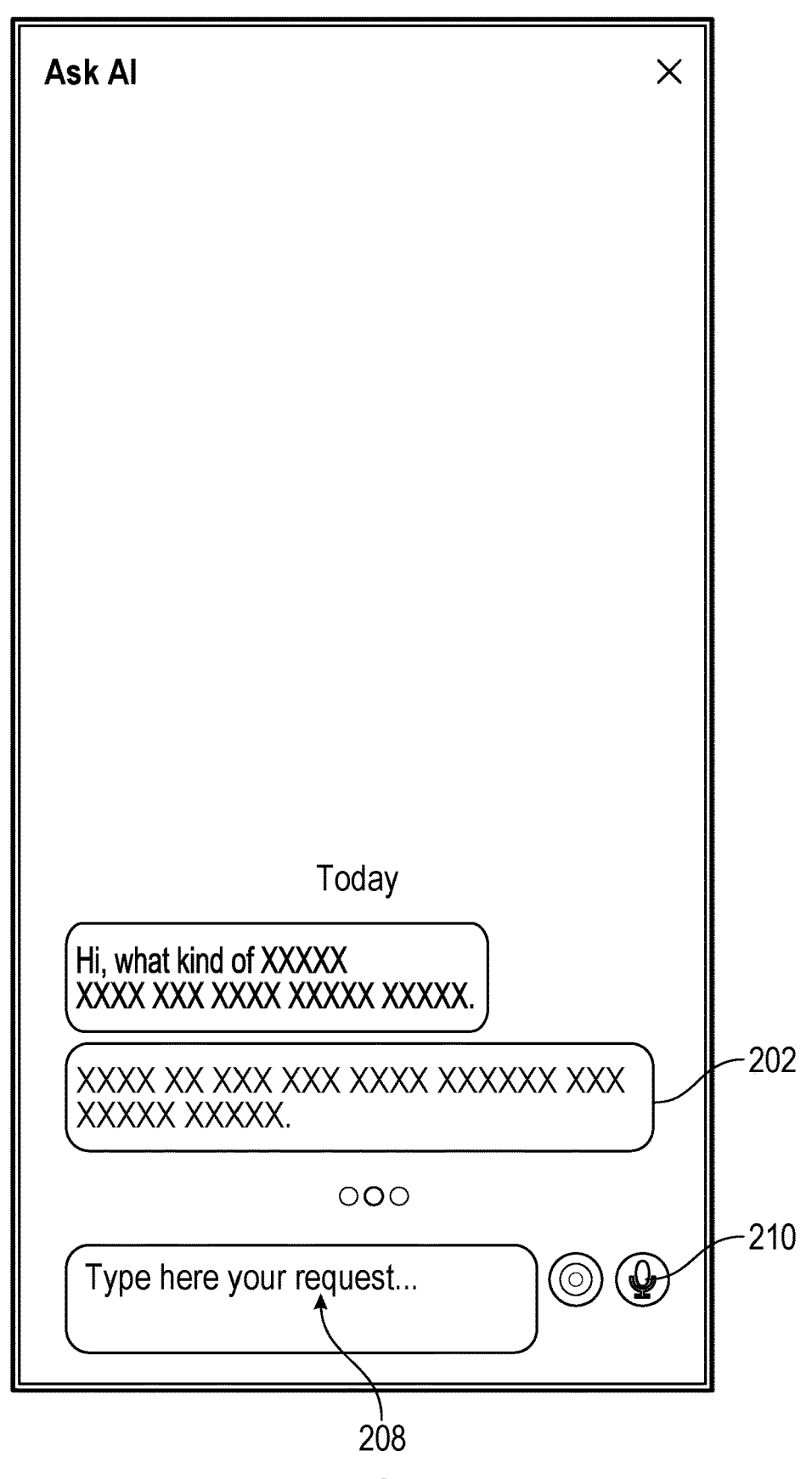
FIG. 2A illustrates a user interface for a landing page for a financial data matching and visualization platform.

FIG. 2A depicts a user interface for a landing page for a financial data matching and visualization platform. The user interface may include a user-inputted search tool bar 208. An example of a request 202 may be "Compare the total amount by the scenario and period for entities 'Rome' and 'Madrid', account 'Product Sales' and version 'Actuals'" or "Show me the 2025 net sales forecast by month and product family." The embedded generative AI in conjunction with one or more embedding modules and natural language processing (NLP) streamline the software navigation process and accelerate data investigation to produce a visualization and response to the user. The natural language processing (NLP) system allows a user to input a request in plain language. The landing page also features a microphone icon 210, which when selected may allow a user to speak their request into their device. The landing page also features a profile icon 212 which when selected allows a user to view and/or edit their profile. The inputs 208, 210 may support multilingual input and/or monolingual input.

Figure 2B:
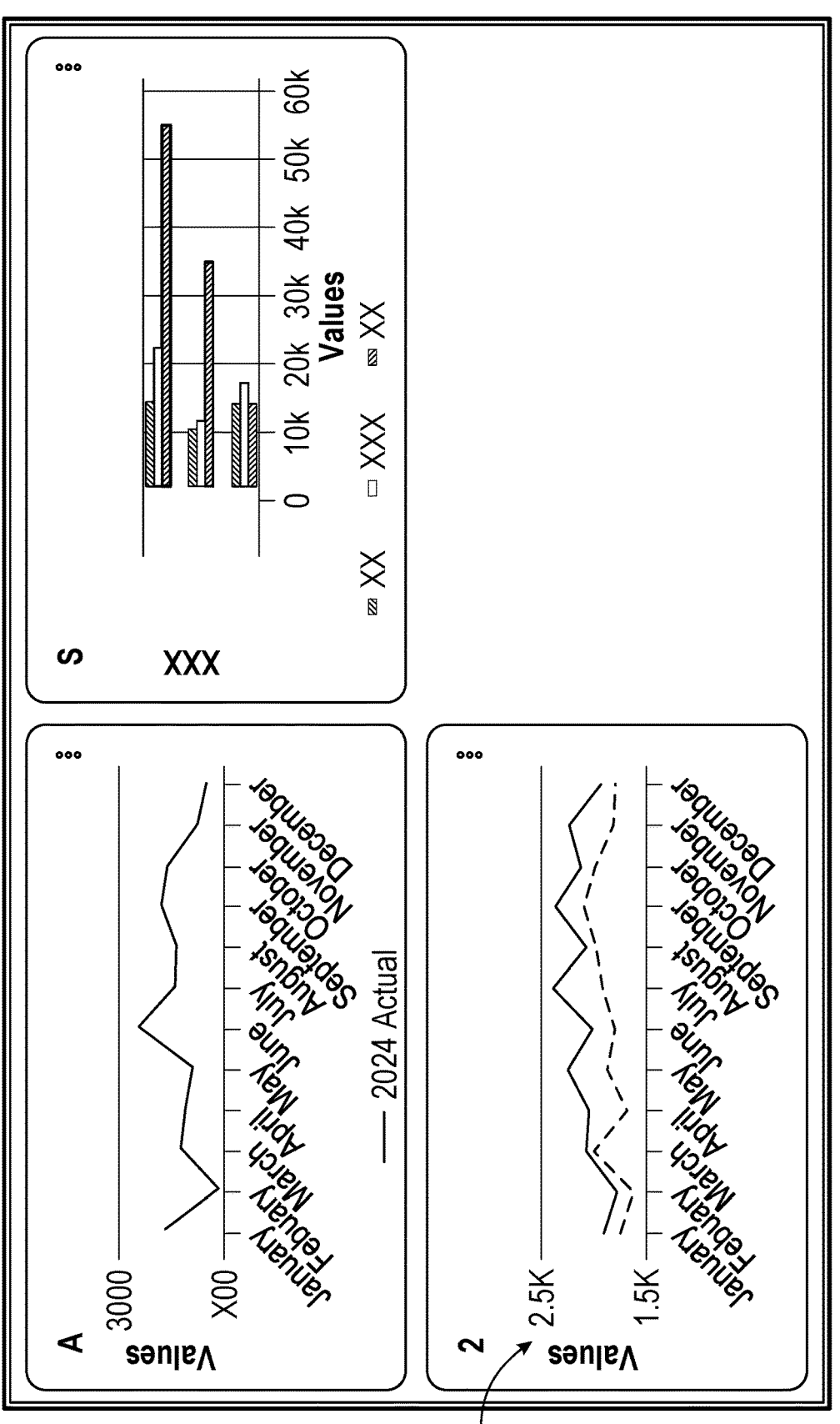
FIG. 2B illustrates a user interface for a landing page for a financial data matching and visualization platform.

FIG. 2B depicts a user interface for a landing page for a financial data matching and visualization platform. The landing page depicts the generated response to the request "Show me the 2025 net sales forecast by month and product family." 202. The response 206 provides data visualization based on a configuration output generated by one or more generative models.

Figure 2C:
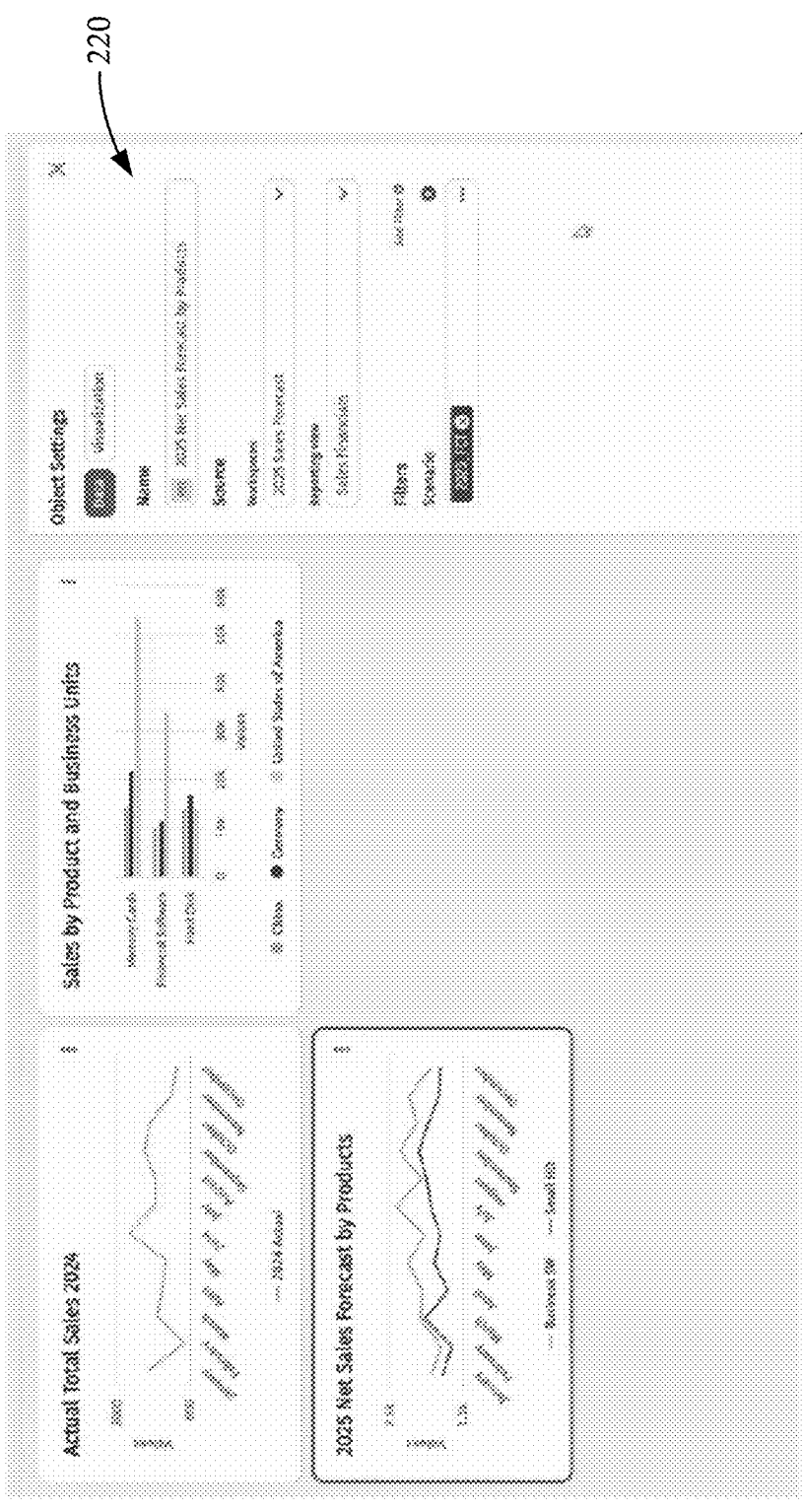
FIG. 2C depicts a user interface including an object settings element that allows a user to interact with data visualizations.

FIG. 2C depicts a user interface including an object settings element 220 that allows a user to interact with data visualizations, for example, modifying current data visualizations and/or retrieving prior data visualizations. In some embodiments, the object settings element 220 includes references and/or terms that are user specific, e.g., obtained from and/or associated with a user-specific dataset that is utilized for the automated data visualization process.

FIG. 3 is a flowchart illustrating a method of automatically generating interface elements based on natural language prompts for domain-specific data, in accordance with some embodiments. At step 302, a data request is received. The data request includes a first natural language prompt, such as "What is the performance for entities Rome and Madrid?" The natural language prompt may include one or more extractable parameters, such as entity identifiers (e.g., Rome, Madrid), operation parameters (e.g., performance), and/or other parameters.

At step 304, and in response to receiving the data request, the natural language prompt is converted to a query in a predetermined query language. For example, in some embodiments, the natural language prompt may be converted into an SQL query, although it will be appreciated that any suitable query language can be used. The natural language prompt to query conversion may be implemented by prompt engineering and/or through the use of a generative model. In some embodiments, elements of the natural language prompt may be utilized to executes the query generated from the received prompt. In some embodiments, query conversion may be model specific, such that transformations by a first generative model are performed using a first process and transformations by a second generative model are performed using a second process. In some embodiments, a meta-platform transformation is defined for each generative model that may be utilized to convert a query.

At step 306, a data search is executed based on the query in the predetermined language. The data search is executed in at least one predetermined data repository selected by the system. For example, one or more data repositories may be provided as a parameter in the natural language prompt. As another example, one or more data repositories may be identified based on one or more additional parameters in the natural language prompt, such as the entity identifiers, an operation parameter, etc. The data repositories may include secure, segregated repositories storing only data relevant to a corresponding user of the system. By segregating the generation of the query from the implementation of the query, the disclosed systems and methods maintain data security for user-specific data while leveraging available generative processes for query generation.

At step 308, a visual interface element is generated based on a configuration output obtained using one or more generative models that receive the converted query input. The generative model(s) that receive the result of the converted query input may be the same generative model used to generate the query and/or may be a different generative model. For example, in some embodiments, a first generative model converts a natural language input to a query syntax for querying one or more datastores. The converted query may be output from the first generative model and executed within a corresponding client data store and provided to a second generative model that utilizes the query to generate a configuration output for generating one or more visual interface elements using the results of the query executed on the client data store.

Figure 4:
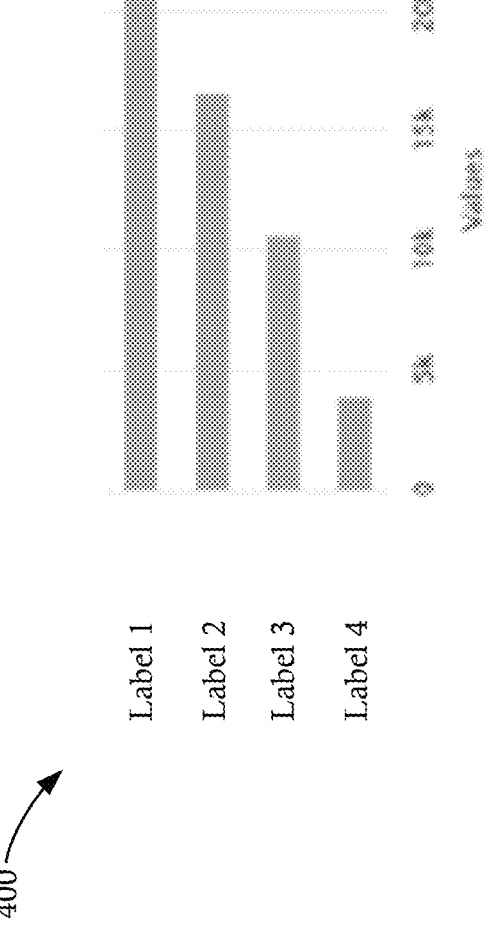
FIG. 4 is a graphical interface element generated in accordance with the method of automatically generating interface elements based on natural language prompts for domain-specific data, in accordance with some embodiments.

The visual interface element illustrates a plurality of data elements identified by the data search. For example, as illustrated in FIG. 4, the visual interface element may include a graph 400. The graph 400 may be generated based on the retrieved data elements and may include representations related to one or more parameters. For example, in the illustrated embodiment, the graph 400 may include one or more axes related to the operation parameter and may include data elements related to the entity identifiers provided in the natural language prompt. In some embodiments, generation of the visual interface element includes selection of an appropriate type of visual interface element, as discussed herein. In some embodiments, the generative model is invoked through an application programming interface that anonymizes, scrubs, and/or otherwise protects data used in the visualization from disclosure to and/or incorporation into the generative model. In other embodiments, a retrieval-augmented generation (RAG) process may be implemented to limit the knowledge base used by a generative model for generation of data visualization elements to known trusted elements and/or a known trusted source. In some embodiments, a user may select metadata for inclusion in a visual interface generation request provided to a generative model.

With reference again to FIG. 3, at step 310, an interface is generated including the visual interface element. The interface is generated by combining the data visualization configurations received from the generative model(s) and the data elements identified in response to executing the generated query on the corresponding user data store. The interface is generated within a secure environment based on the configuration elements, which maintains security of user data within the environment. The generative model is capable of generating the configuration object(s) based solely on the query without needing access to the underlying results (e.g., user data). User-specific data is accessed only within the secure environment to populate interface elements based on the previously generated configuration object. By partitioning generation of the configuration objects from use of the user-specific data, the disclosed systems and methods maintain user privacy while enabling generative selection of visual elements based on a user provided natural language query.

In some embodiments, the interface includes a dashboard interface of a software platform that provides additional and/or alternative functionalities for data visualization, data exploration, data processing, etc. The interface elements generated based on the visual element configurations may be presented in conjunction with additional interface elements (e.g., textual elements, visual elements) that are selected in response to the generated query and/or provided by the software platform.

At step 312, and in response to generating the interface, a source request is received. The source request includes a second natural language prompt that identifies at least one data element represented in the visual interface. For example, a source request based on the visual interface element of FIG. 4 may include a request such as "Can you point me to Product Sales details of the unit 'Madrid'?" Although certain example embodiments are discussed herein, it will be appreciated that the natural language prompts may include any suitable prompts and/or any suitable included parameters.

At step 314, a trained source identification model is applied to the source request. The trained source identification model is configured to receive the source request and the result of the data search and identify the at least one data element in the at least one predetermined data repository. In some embodiments, the trained source identification model includes a trained machine learning model, such as a RAG-configured generative model. In some embodiments, one or more prompts may be pre-provided to the trained source identification model to limit the knowledge base used by the trained source identification model to only trusted data sources.

At step 316, the interface is updated to include an interface element representative of the output of the trained source identification model. For example, the interface may be updated to include annotations, visual elements, textual elements, etc. that indicate the source of data and/or allow navigation to the source of data for the data element(s) identified in the source query. The interface may be updated by overlaying the additional interface elements on the existing interface and/or a updated by generating a new interface including the interface elements representative of the output of the trained source identification model.

In general, a trained function mimics cognitive functions that humans associate with other human minds. In particular, by training based on training data the trained function is able to adapt to new circumstances and to detect and extrapolate patterns.

In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

In some embodiments, a trained function may include a neural network, a support vector machine, a decision tree, a Bayesian network, a clustering network, Qlearning, genetic algorithms and/or association rules, and/or any other suitable artificial intelligence architecture. In some embodiments, a neural network may be a deep neural network, a convolutional neural network, a convolutional deep neural network, etc. Furthermore, a neural network may be an adversarial network, a deep adversarial network, a generative adversarial network, etc.

Figure 5A:
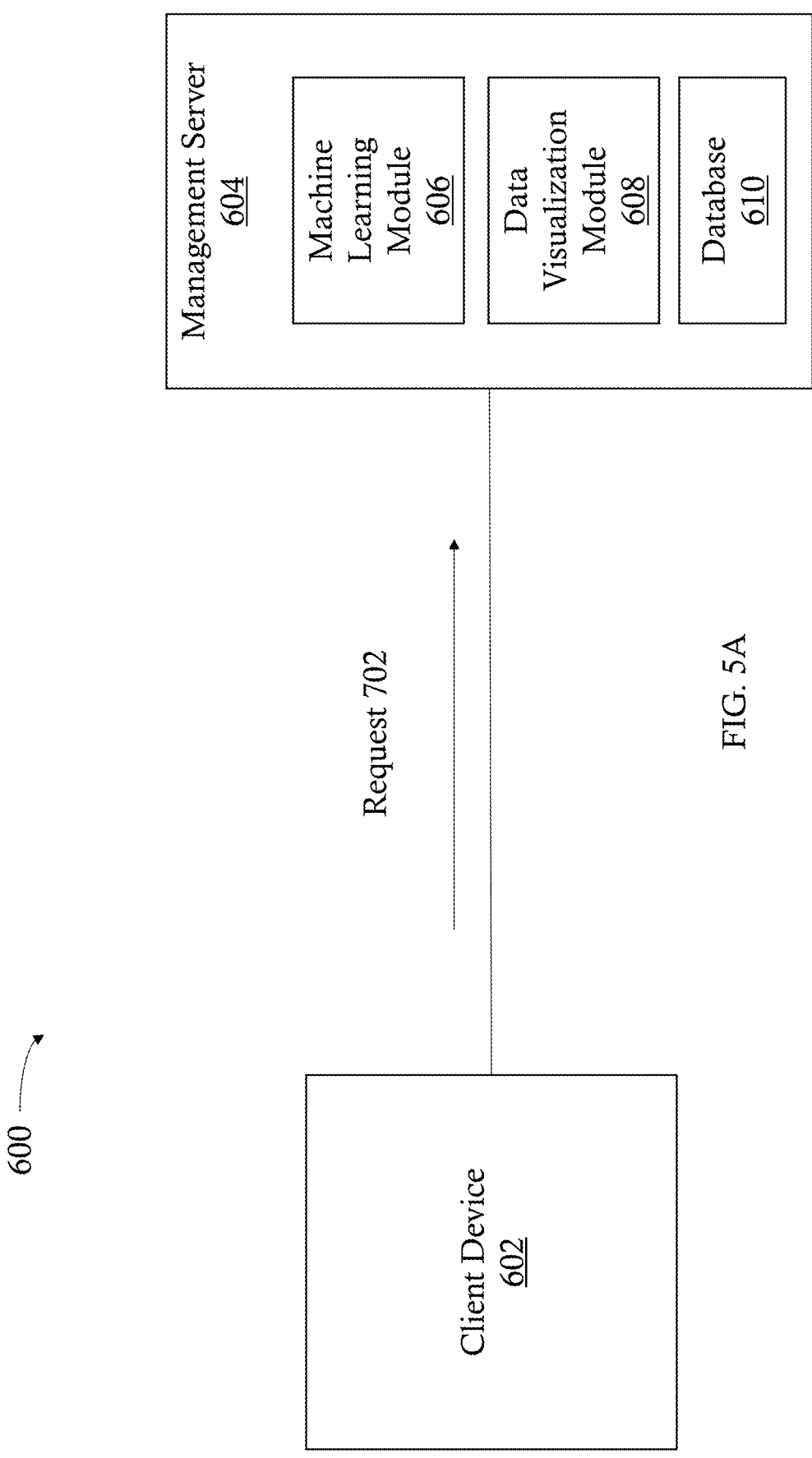
FIG. 5A-5F illustrate a block diagram of a system in accordance with some embodiments.

Referring to FIG. 5A, there is shown a block diagram illustrating an implementation of a system for financial data matching, visualization, and/or system navigation, generally designated 600 and referred to as system 600. While some example features are illustrated, various other features have not been illustrated for the sake of brevity and so as not to obscure pertinent aspects of the example embodiments disclosed herein. To that end, as a non-limiting example, the system for financial data visualization and/or system navigation 600 may include one or more computing devices in communication with one or more networked servers. The one or more networked servers may share any number of logical units.

In one embodiment, the system 600 comprises a management server 604, one or more client devices 602, a machine learning module 606, a data visualization module 608, and a database 610. The management server 602 may be one or more computing servers that provide secure access to financial data which may be stored on the database 610. The database 610 may have stored thereon data relating to financial information.

The system 600 includes a client device 602. The client device may be a personal computer. The client device 602 may send a request 702 to a management server 604. The management server 604 includes a plurality of electrical and electronic components that provide power, operational control, and protection of the components within the server 604. For example, as illustrated in FIG. 5A, the server 604 may include a machine learning module 606 and/or a data visualization module 608. The machine learning module may facilitate data interconnection, analysis efficiency, and/or complex data navigation. The data visualization module may provide data visualization and/or commentary generation. In addition, the server 604 may include a data visualization module 608. The data visualization module may streamline the creation of a visualization type that best fits and represents the data requested by the user. In this figure, an example of a request 702 that may be sent by the user includes a prompt of "What's the performance for the entities Rome and Madrid?"

Figure 5B:
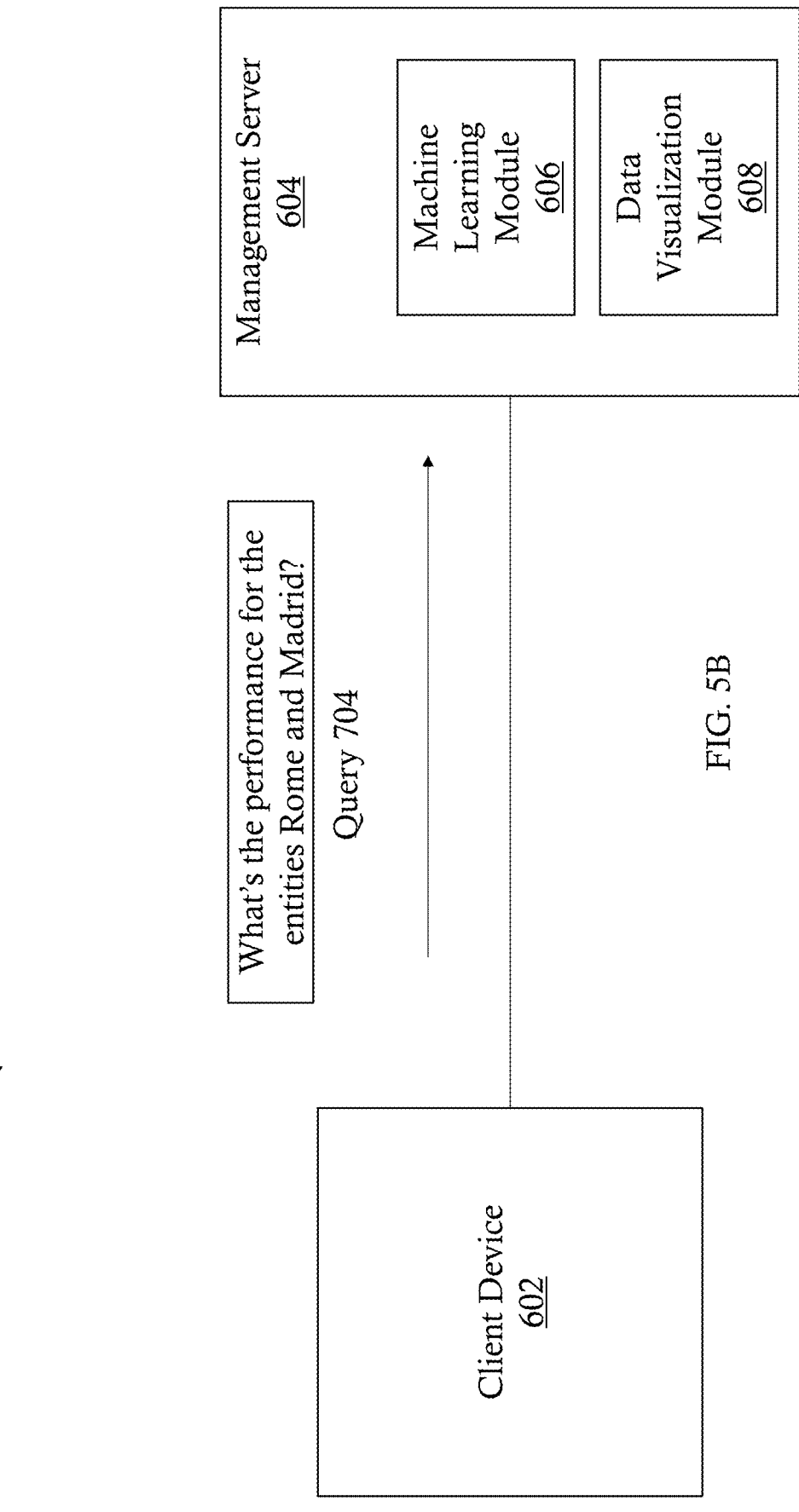

FIG. 5B illustrates a system 600 with computing components that are implemented by one or more of the computing components described in FIG. 5A with respect to generating visual finance data, according to some embodiments. Once the management server 604 receives the user-inputted request 702, the machine learning module 606 may determine the best visualization type for the data. Examples of visualization types may include a bar chart, line chart, pie chart, histogram, scatter plot, and heat map, among others.

In this figure, the machine learning module 606 may determine a "line chart" to be the most appropriate visualization type.

Figure 5C:
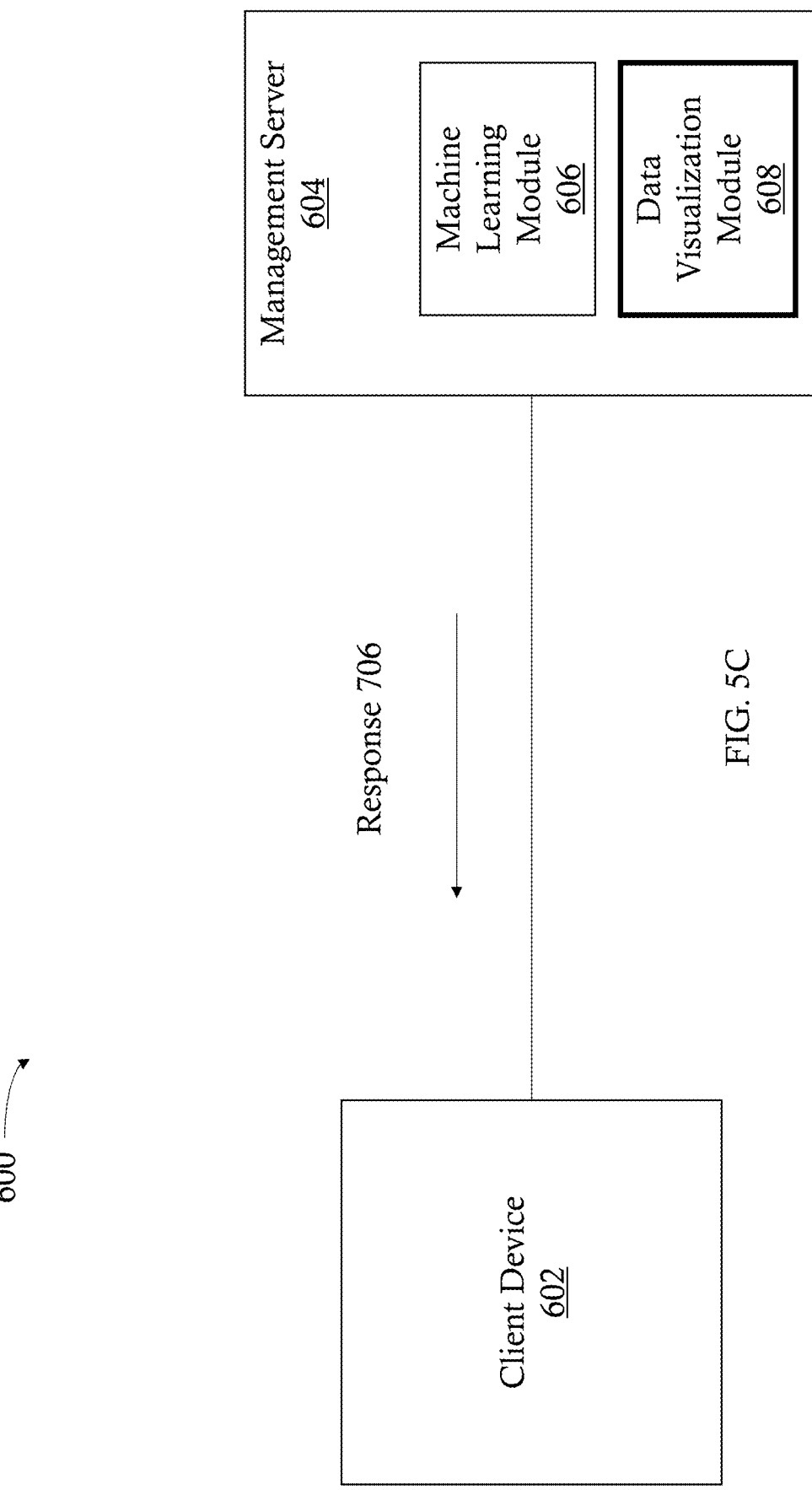

FIG. 5C illustrates a system 600 with computing components that are implemented by one or more of the computing components described in FIG. 5A with respect to generating visual finance data, according to some embodiments of the invention. Once the machine learning module 606 determines the appropriate visualization type for the requested data, it may then determine the appropriate parameters to fit the data using the initial prompt from the user and the determined appropriate visualization type.

Parameters may be user-inputted as names, measures, and/or dimensions. In the context of chart visualizations, "names" "measures" and "dimensions" are terms often used in data analysis and visualization tools like business intelligence software. Names, measures and dimensions may help organize and understand data in charts more effectively. Names may represent labels or identifiers assigned to various elements within the chart. These names help users understand and interpret the data being presented. Examples of names may include axis labels, legend labels, data point labels and chart title. Names in chart visualizations may serve to provide clarity, context, and understanding to viewers by labeling various elements within the chart. Names may help users interpret the data accurately and draw meaningful insights from the visual representation. Measures may represent the numerical data or quantitative values that you want to analyze or visualize. Measures may be numeric and can be aggregated using mathematical functions like sum, average, count, etc. Examples of measures include sales revenue, profit, quantity sold, temperature, among others. Measures may be represented along the axes of a chart (e.g., the y-axis of a bar chart or the values plotted on a line chart). Dimensions may be referred to herein as attributes or categorical variables used to group, categorize, or segment the data. They provide context to the measures and are typically qualitative. Examples of dimensions may include time (date, year, month), geographic location (country, city), product categories, customer segments, etc. Dimensions may be used to enable users to analyze how measures vary across different categories or groups. Dimensions are often represented by the various data points or categories on the x-axis of a chart or used for grouping and coloring data.

Parameters may be in the form of numerical, categorical, temporal, and/or geographical. Numerical parameters may include revenue, expenses, profit, earnings per share, profit margin, assets, liabilities, equity, return on investment, market capitalization, dividend yield, and/or volatility. Categorical parameters may include industry sector, market segment, geographic region, credit rating, investment style, asset class, market exchange, company size, risk level, regulatory compliance, and/or market condition. Temporal parameters may include date, time stamp, fiscal period, time interval, and/or duration. Geographical parameters may include country, region, city, exchange, currency, foreign exchange rate, and/or interest rates by country. In FIG. 5C, the machine learning module may determine, for example, the most appropriate parameters to be Rome/Madrid, product sales, and actuals based off the user-inputted request 702 in FIG. 5A.

Figure 5D:
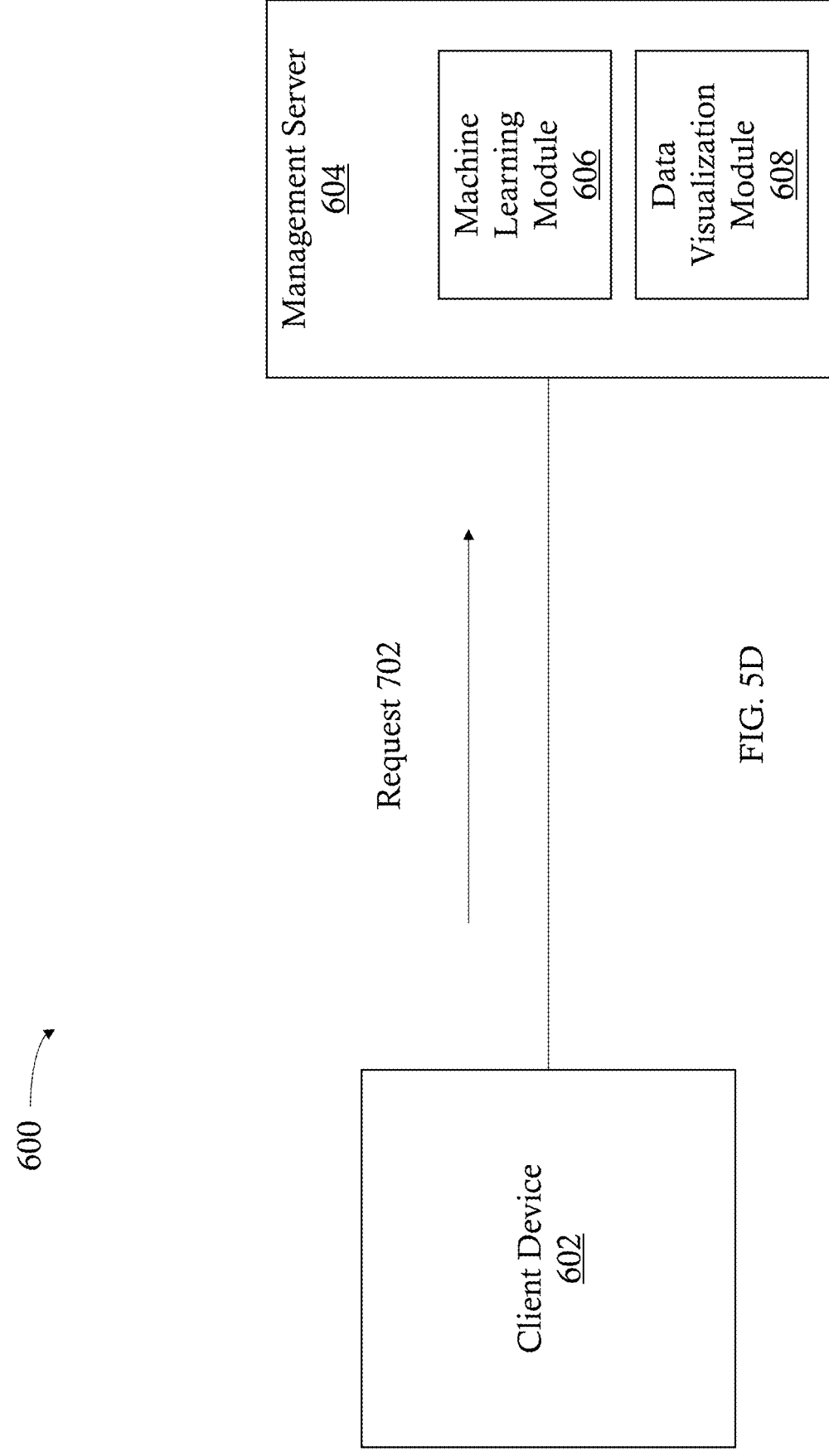

FIG. 5D illustrates a system 600 with computing components that are implemented by one or more of the computing components described in FIG. 5A with respect to generating visual finance data, according to some embodiments of the invention. Once the machine learning module determines the most appropriate parameters to fit the user-requested data, a third request may be sent to the data visualization module 608. The third request may be used to match the visualization type and the parameters with the database stored system language. This matching process enables the user to input requests in plain language, as the data visualization module may then translate the request to match the format of the data stored in the database. The data visualization module may then use the visualization type and parameters to identify and match the correct data stored in the database to then generate the visualization result.

Figure 5E:
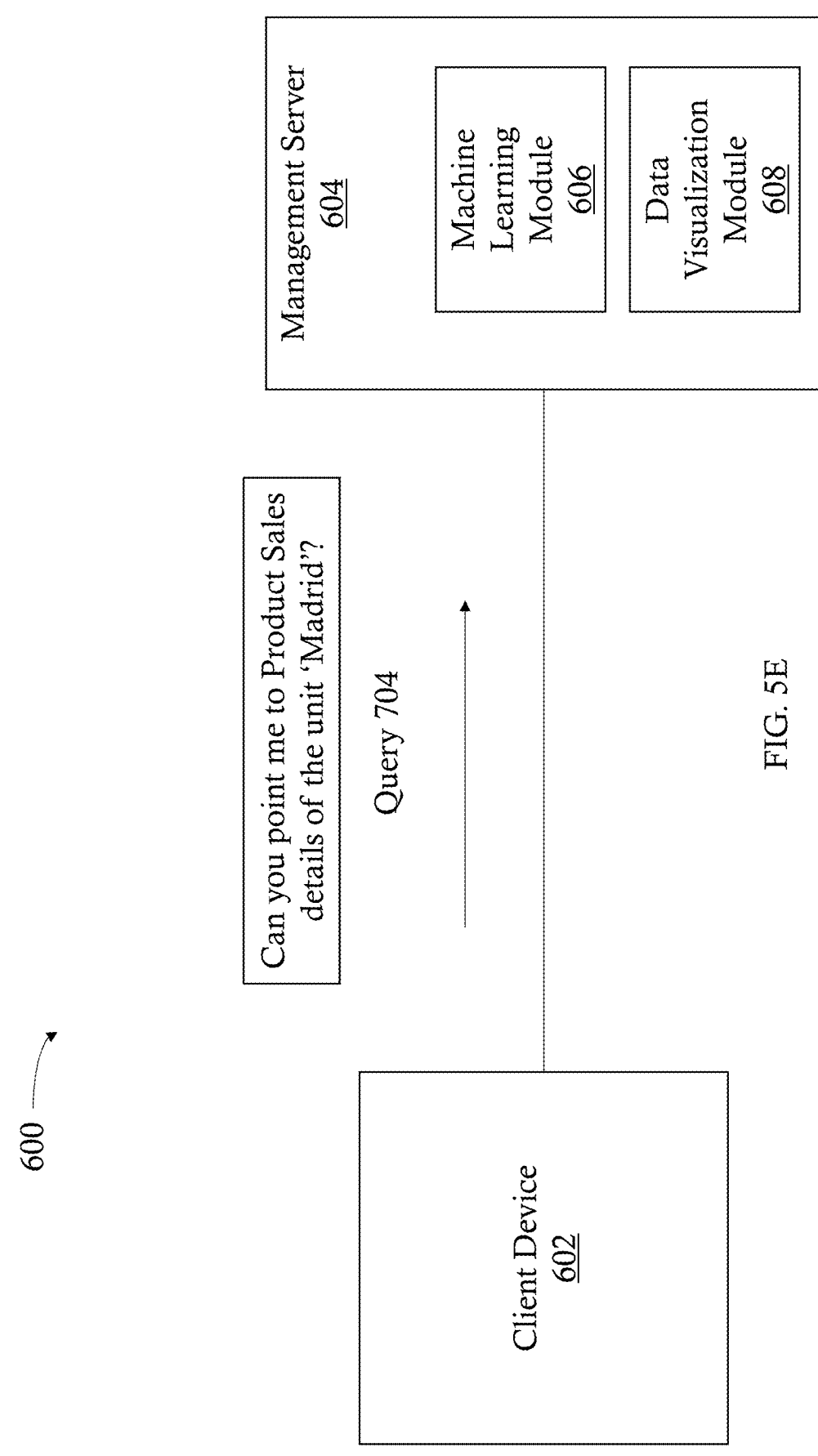
Figure 5F:
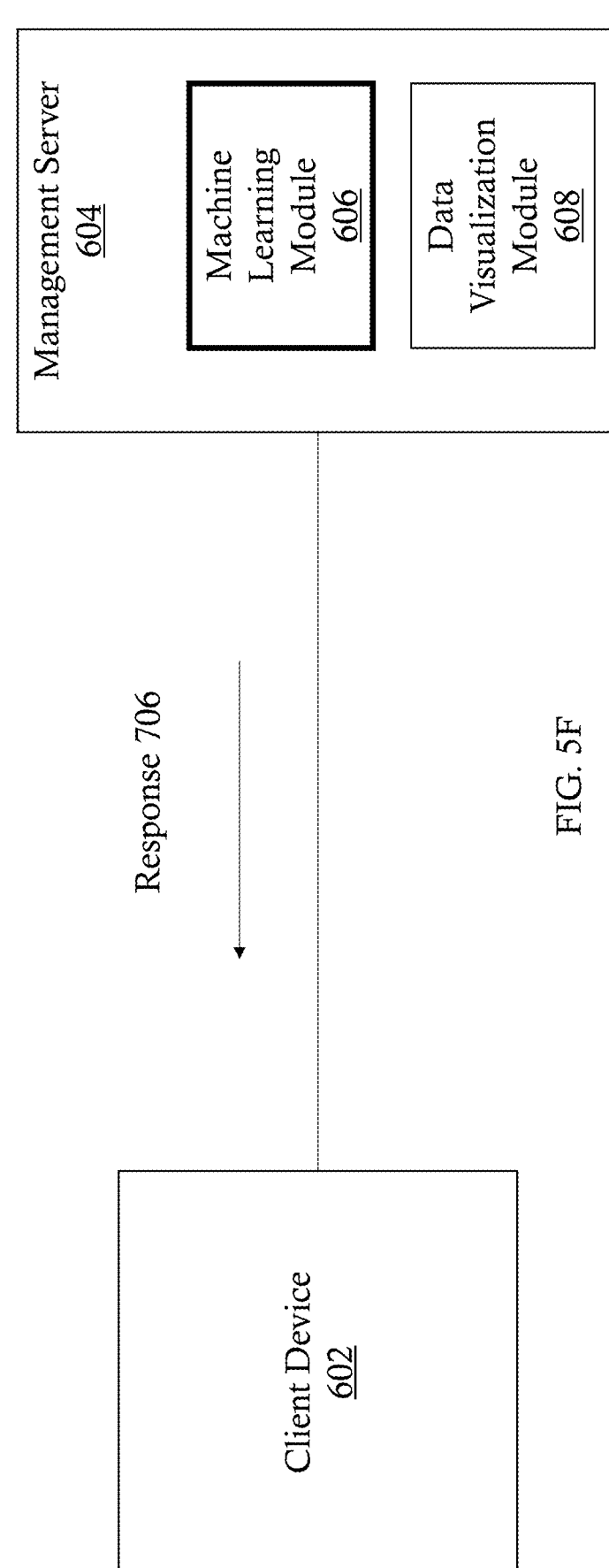

FIG. 5E illustrates a system 600 with computing components that are implemented by one or more of the computing components described in FIG. 5A with respect to generating visual finance data, according to some embodiments of the invention. Once the data visualization module 608 identifies and matches the user request to the format of the data stored in the database, the visualization may then be generated and sent back to the user. In FIG. 5E, the response 706, represents the line chart comparing Madrid's and Rome's product sales versus actuals. This response may be sent to the client device 602.

Figure 6A:
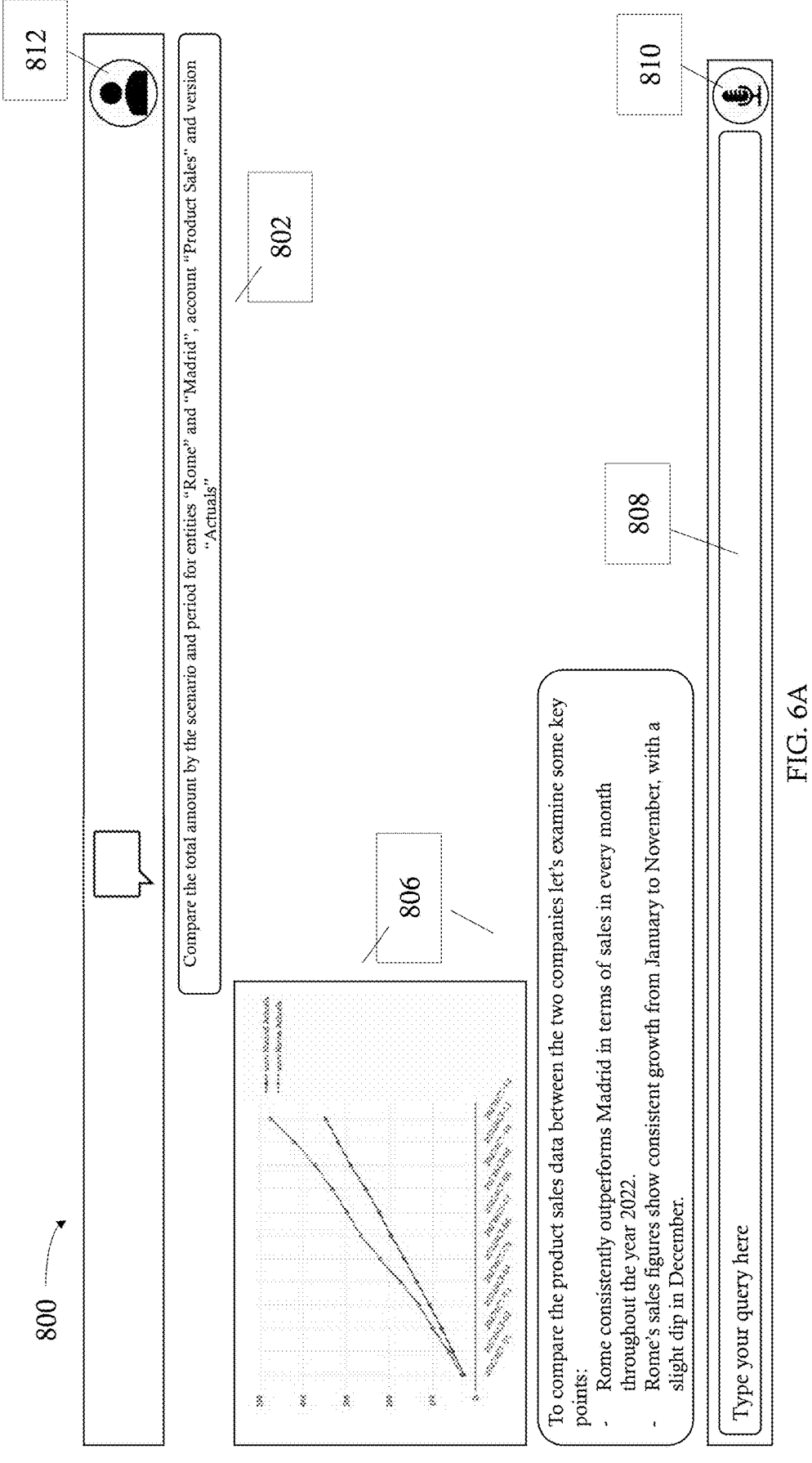
FIG. 6A-6D illustrate exemplary user interfaces generated by the management server associated with a method of requesting, viewing, and downloading financial data, in accordance with some embodiments.

Turning now to FIG. 6A, a exemplary user interfaces generated by the management server associated with a method of requesting, viewing, and downloading financial data, in accordance with some embodiments, is illustrated. FIG. 6A depicts a user interface for a landing page for a financial data matching and visualization platform. The user interface may include a user-inputted search tool bar 808. An example of a request 802 may be "Compare the total amount by the scenario and period for entities 'Rome' and 'Madrid', account 'Product Sales' and version 'Actuals.'" The embedded generative AI in conjunction with the machine-learning module and natural language processing (NLP) streamline the software navigation process and accelerate data investigation to produce a visualization and response 806 to the user. The natural language processing (NLP) system allows a user to input a request in plain language. The landing page also features a microphone icon 810, which when selected may allow a user to speak their request into their device. The landing page also features a profile icon 812 which when selected allows a user to view and/or edit their profile.

Figure 6B:
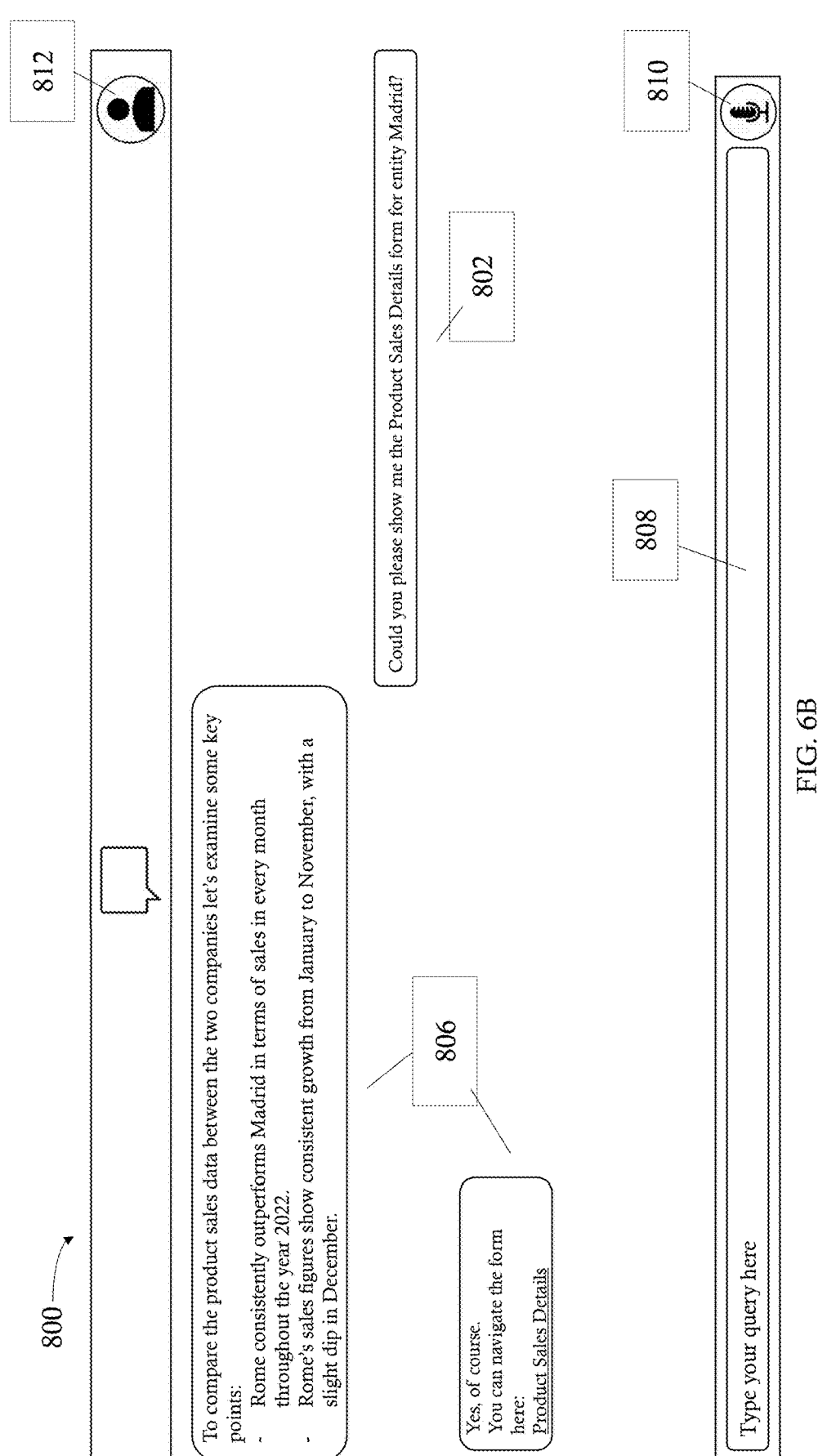
Figure 6C:
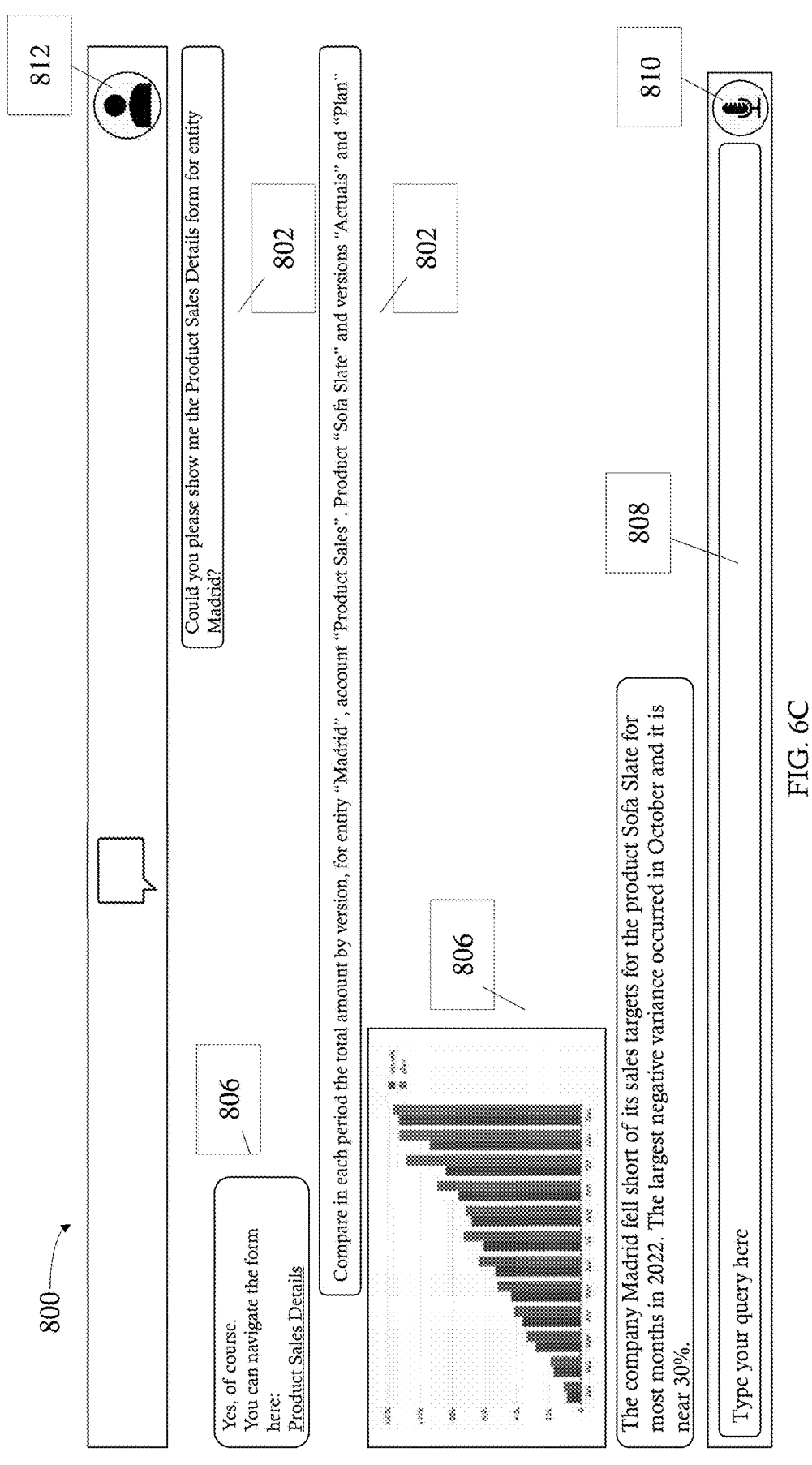
Figure 6D:
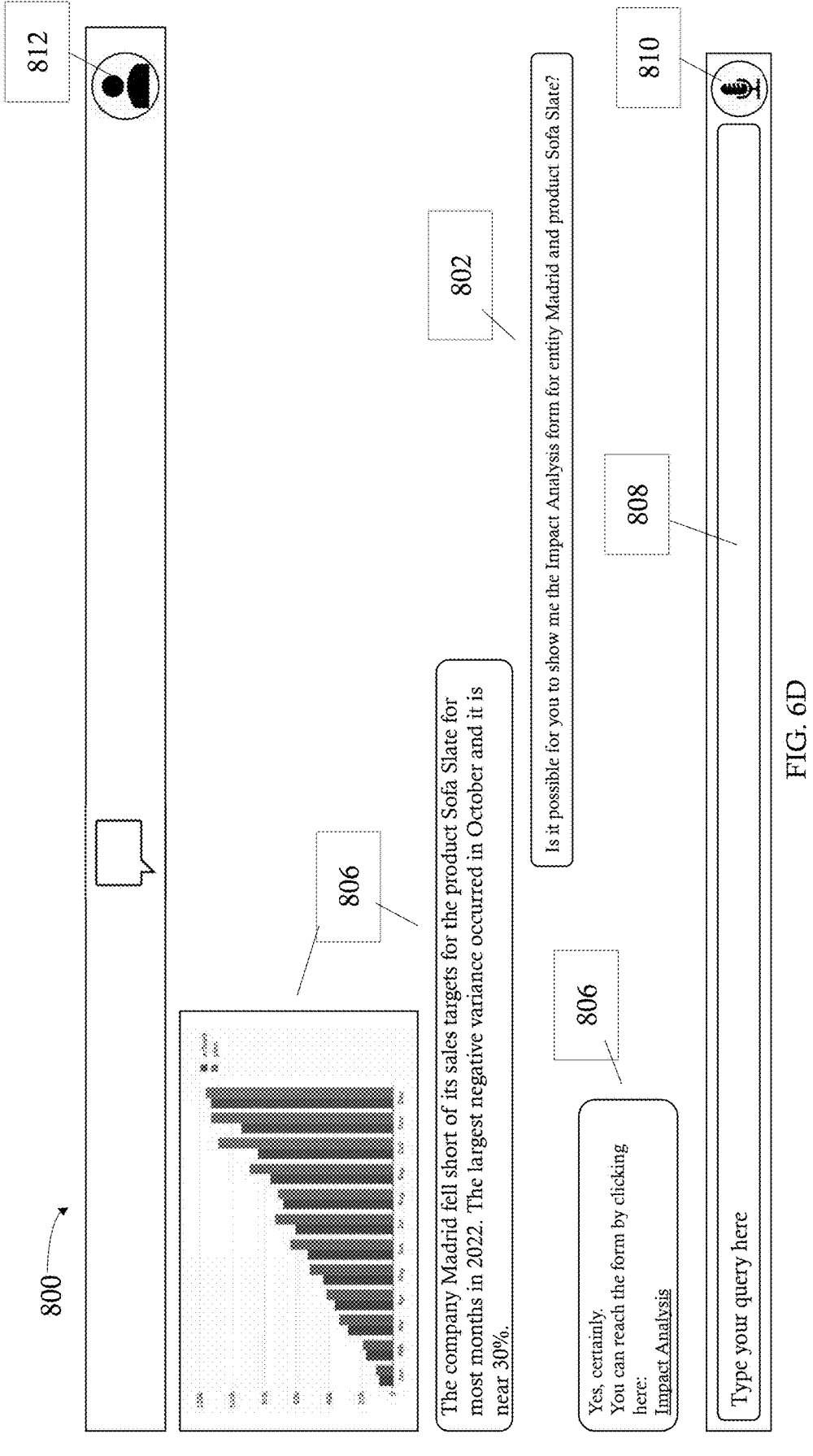

FIG. 6B depicts a user interface for a landing page for a financial data matching and visualization platform. The landing page depicts the generated response to the request "Could you please show me the Product Sales Details for entity Madrid?" 802. The response 806 provides system navigation directions in the form of a linked phrase, "Product Sales Details." FIGS. 6C & 6D illustrate additional user interface examples for one or more responses and/or visualization elements generated in response to one or more requests, as discussed herein.

Figure 7:
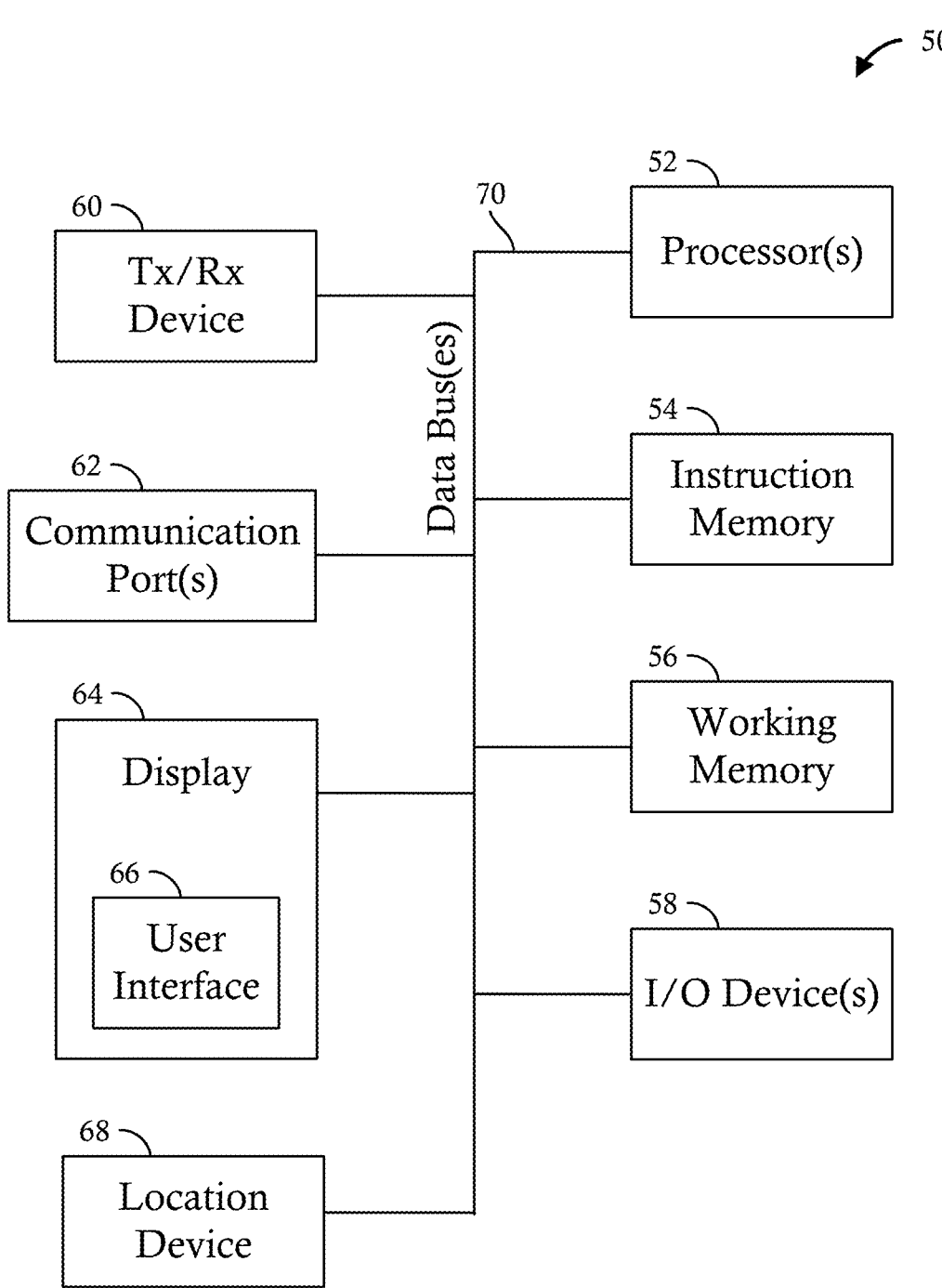
FIG. 7 illustrates a block diagram of a computing device in accordance with some embodiments.

FIG. 7 illustrates a block diagram of a computing device 50, in accordance with some embodiments. In some embodiments, each of the data management computing device 4, the web server 6, the one or more processing devices 10, the workstation(s) 12, and/or the user computing devices 16, 18, 20 in FIG. 1 may include the features shown in FIG. 2. Although FIG. 7 is described with respect to certain components shown therein, it will be appreciated that the elements of the computing device 50 may be combined, omitted, and/or replicated. In addition, it will be appreciated that additional elements other than those illustrated in FIG. 7 may be added to the computing device.

As shown in FIG. 7, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g., NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g., NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for automatically generating interface elements based on natural language prompts for domain-specific data sets, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or down-loading) of data, such as machine learning model training data.

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, Fire Wire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. The user interfaces 66 may enable user interaction with generated visual interface elements representative of data search results and/or other interface elements representative of a source request result. For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices) that execute an operating system, system programs, and application programs, while also implementing the engine using multitasking, multithreading, distributed (e.g., cluster, peer-peer, cloud) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Identification and generation of visual interface elements associated with domain-specific datasets can be burdensome and time consuming for users, especially if users must manually perform searching and graphical element generation. Typically, a user must have preexisting knowledge of both a data store location and a query language in order to locate data regarding a domain-specific inquiry. Current processes also require an understanding of data exportation processes, visual element generation processes, and navigation of complicated user interface menu elements to identify source information and/or allow source searching.

Systems and methods as disclosed herein significantly reduce this problem, allowing users to locate relevant domain-specific data and/or generate visual interface elements with fewer, or in some case no, active steps. For example, in some embodiments described herein, when a user requires certain information, retrieval of the corresponding data and visual presentation of the data are automatically implemented without required manual action on the part of the user. Beneficially, programmatically identifying relevant data elements within a data store and automatically generating a visual representation to be presented to a user may improve the speed of the user's navigation. This may be particularly beneficial for users who lack technical knowledge to retrieve domain-specific data within a separate specific domain.

It will be appreciated that conversion of natural language prompts to predetermined language queries, automated generation of visual interface elements, and automated source retrieval, as disclosed herein, particularly on large datasets intended to be used in specialized knowledge domains, is only possible with the aid of computer-assisted machine-learning algorithms and techniques, such as the disclosed systems and methods. In some embodiments, machine learning processes are used to perform operations that cannot practically be performed by a human, either mentally or with assistance.

Figure 8:
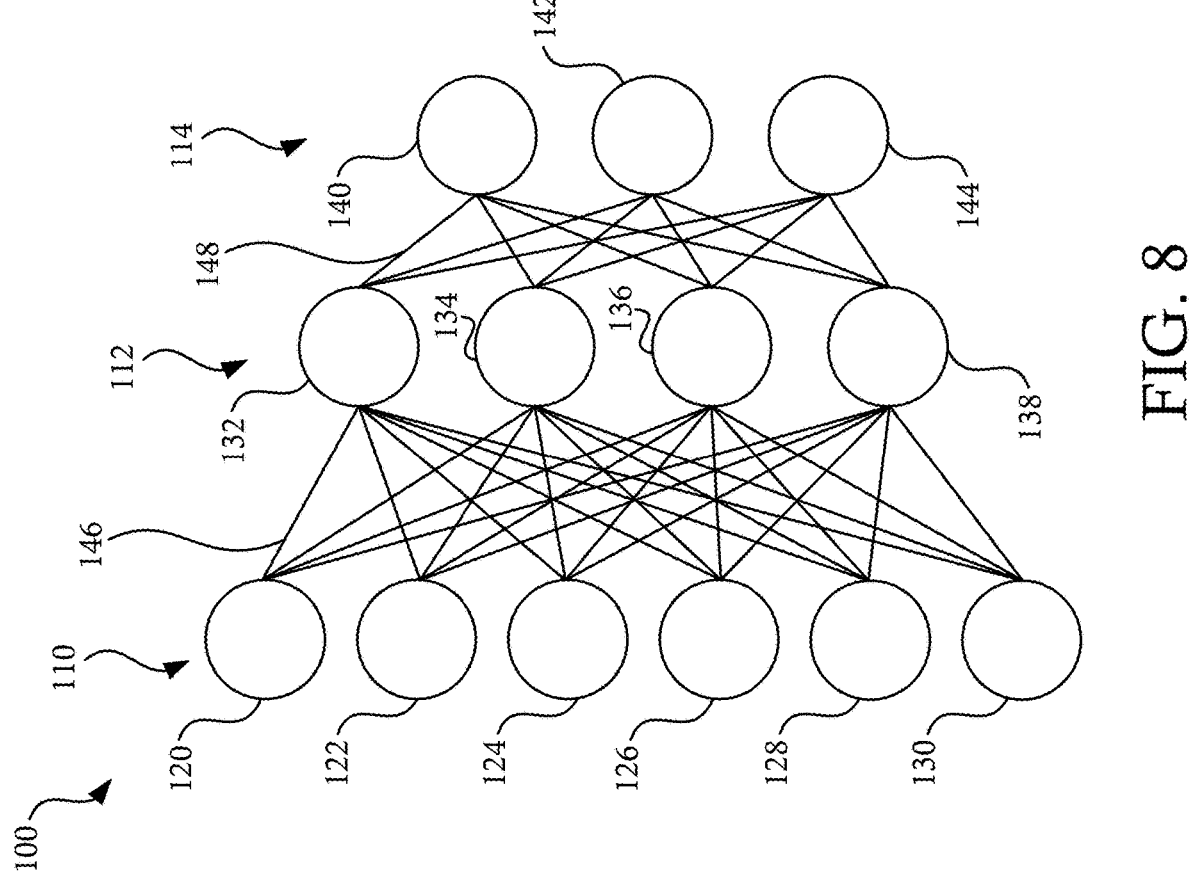
FIG. 8 illustrates an artificial neural network, in accordance with some embodiments.

FIG. 8 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 may be arranged in layers 110-114, wherein the layers may comprise an intrinsic order introduced by the edges 146-148 between the nodes 120-144 such that edges 146-148 exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 may be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number may be assigned as a value to every node 120-144 of the neural network 100. Here, $$x_i^{(n)}$$

denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 may comprise a weight being a real number, in particular, the weight is a real number within the interval [−1, 1], within the interval [0, 1], and/or within any other suitable interval. Here, $$w_{i,j}^{(m,n)}$$

denotes the weight of the edge between the i-th node 120-138 of the m-th layer 110, 112 and the j-th node 132-144 of the n-th layer 112, 114. Furthermore, the abbreviation $$w_{i,j}^{(n)}$$

is defined for the weight $$w_{i,j}^{(n,n+1)}.$$

In particular, to calculate the output values of the neural network 100, the input values are propagated through the neural network. In particular, the values of the nodes 132-144 of the (n+1)-th layer 112, 114 may be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 may be calculated based on the values of the input layer 110 of the neural network and/or based on the values of a prior hidden layer, etc.

In order to set the values $$w_{i,j}^{(m,n)}$$

for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}'^{(n)} = w_{i,j}^{(n)} - \gamma \cdot \delta_j^{(n)} \cdot x_i^{(n)}$$

wherein γ is a learning rate, and the numbers $$\delta_j^{(n)}$$

may be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $$\delta_j^{(n+1)},$$

if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 114, wherein f' is the first derivative of the activation function, and $$y_j^{(n+1)}$$

is the comparison training value for the j-th node of the output layer 114.

Figure 9:
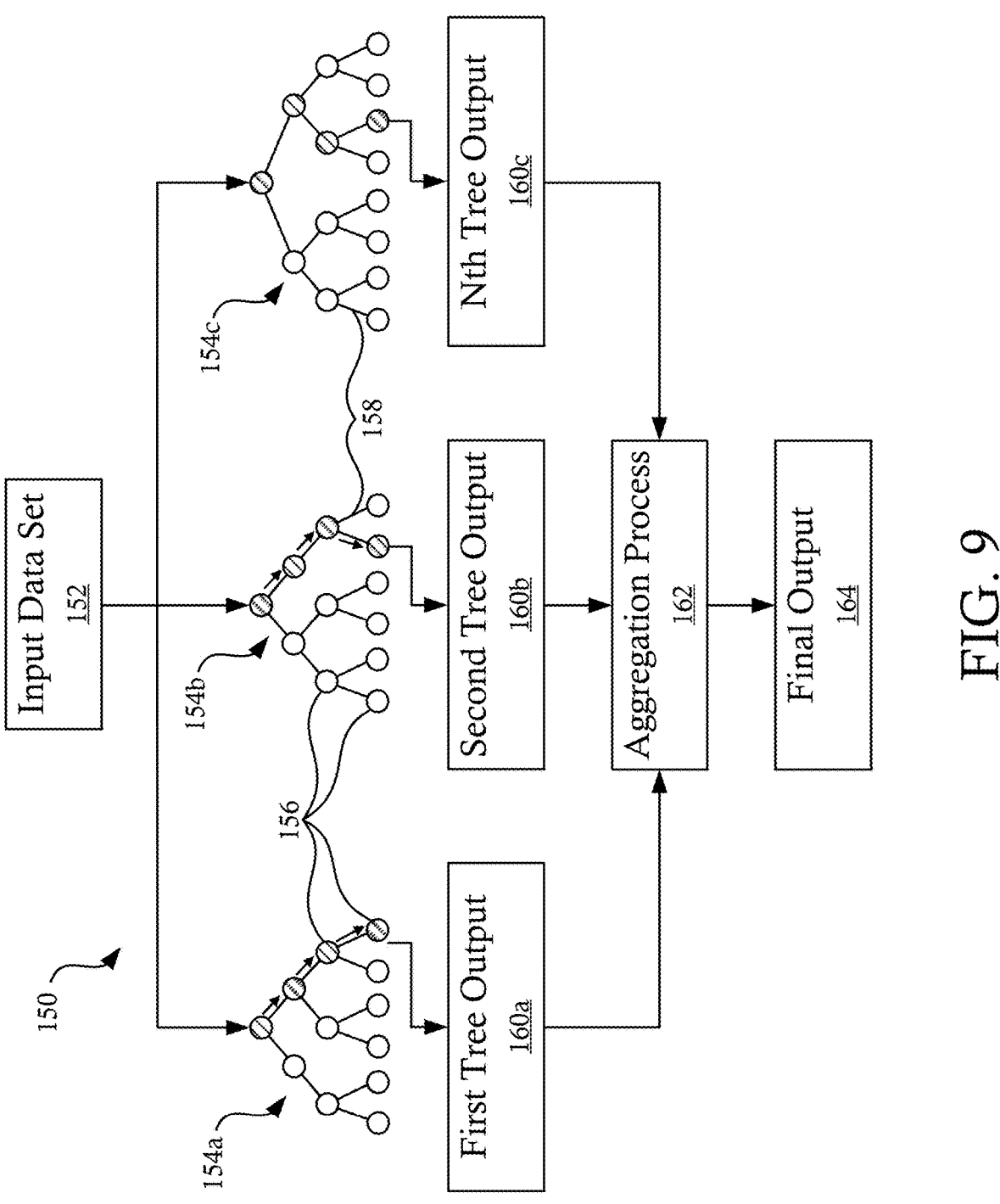
FIG. 9 illustrates a tree-based neural network, in accordance with some embodiments.

FIG. 9 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c may include a classification and/or a regression tree (CART). Classification trees include a tree model in which a target variable may take a discrete set of values, e.g., may be classified as one of a set of values. In classification trees, each leaf 156 represents class labels and each of the branches 158 represents conjunctions of features that connect the class labels. Regression trees include a tree model in which the target variable may take continuous values (e.g., a real number value).

In operation, an input data set 152 including one or more features or attributes is received. A subset of the input data set 152 is provided to each of the trained decision trees 154a-154c. The subset may include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 may apply a majority-voting process to identify a classification selected by the majority of the trained decision trees 154a-154c. As another example, in embodiments including regression trees, the tree-based neural network 150 may apply an average, mean, and/or other mathematical process to generate a composite output of the trained decision trees. The final output 164 is provided as an output of the tree-based neural network 150.

Figure 10:
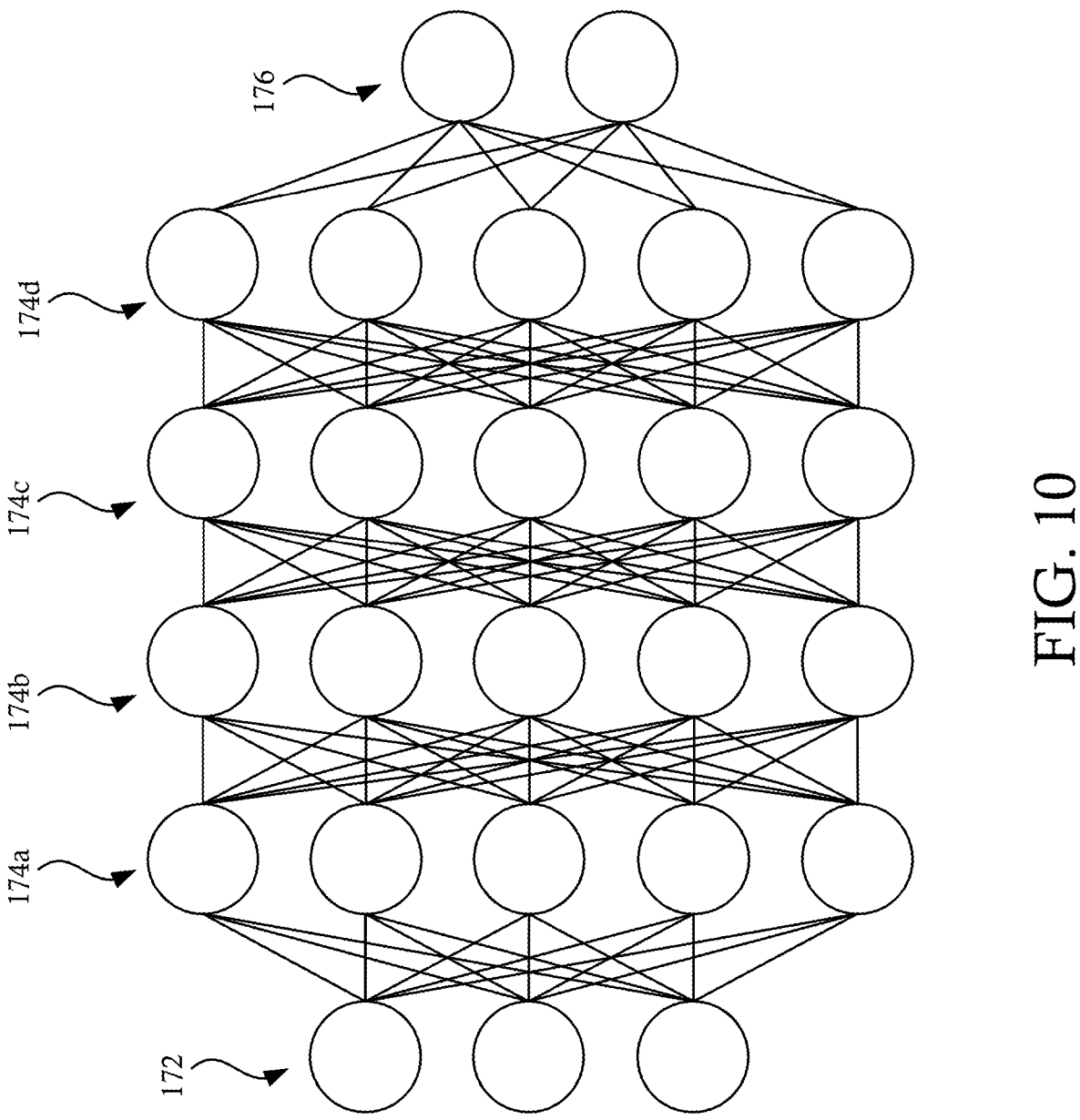
FIG. 10 illustrates a deep neural network (DNN), in accordance with some embodiments.

FIG. 10 illustrates a deep neural network (DNN) 170, in accordance with some embodiments. The DNN 170 is an artificial neural network, such as the neural network 100 illustrated in conjunction with FIG. 8, that includes representation learning. The DNN 170 may include an unbounded number of (e.g., two or more) intermediate layers 174a-174d each of a bounded size (e.g., having a predetermined number of nodes), providing for practical application and optimized implementation of a universal classifier. Each of the layers 174a-174d may be heterogenous. The DNN 170 may be configured to model complex, non-linear relationships. Intermediate layers, such as intermediate layer 174c, may provide compositions of features from lower layers, such as layers 174a, 174b, providing for modeling of complex data.

In some embodiments, the DNN 170 may be considered a stacked neural network including multiple layers each configured to execute one or more computations. The computation for a network with L hidden layers may be denoted as:

$$f(x) = f\left[a^{(L+1)}\left(h^{(L)}\left(a^{(L)}\left(\ldots\left(h^{(2)}\left(a^{(2)}\left(h^{(1)}\left(a^{(1)}(x)\right)\right)\right)\right)\right)\right)\right)\right]$$

where $a^{(l)}(x)$ is a preactivation function and $h^{(l)}(x)$ is a hidden-layer activation function providing the output of each hidden layer. The preactivation function $a^{(l)}(x)$ may include a linear operation with matrix $W^{(l)}$ and bias $b^{(l)}$, where:

$$a^{(l)}(x) = W^{(l)}x + b^{(l)}$$

In some embodiments, the DNN 170 is a feedforward network in which data flows from an input layer 172 to an output layer 176 without looping back through any layers. In some embodiments, the DNN 170 may include a backpropagation network in which the output of at least one hidden layer is provided, e.g., propagated, to a prior hidden layer. The DNN 170 may include any suitable neural network, such as a self-organizing neural network, a recurrent neural network, a convolutional neural network, a modular neural network, and/or any other suitable neural network.

In some embodiments, a DNN 170 may include a neural additive model (NAM). An NAM includes a linear combination of networks, each of which attends to (e.g., provides a calculation regarding) a single input feature. For example, a NAM may be represented as:

$$y = \beta + f_1(x_1) + f_2(x_2) + \ldots + f_K(x_K)$$

where β is an offset and each $f_i$ is parametrized by a neural network. In some embodiments, the DNN 170 may include a neural multiplicative model (NMM), including a multiplicative form for the NAM mode using a log transformation of the dependent variable y and the independent variable x:

$$y = e^{\beta} e^{f((\log x)} e^{\sum_i f_i^d(d_i)}$$    5 where d represents one or more features of the independent variable x.

Figure 11:
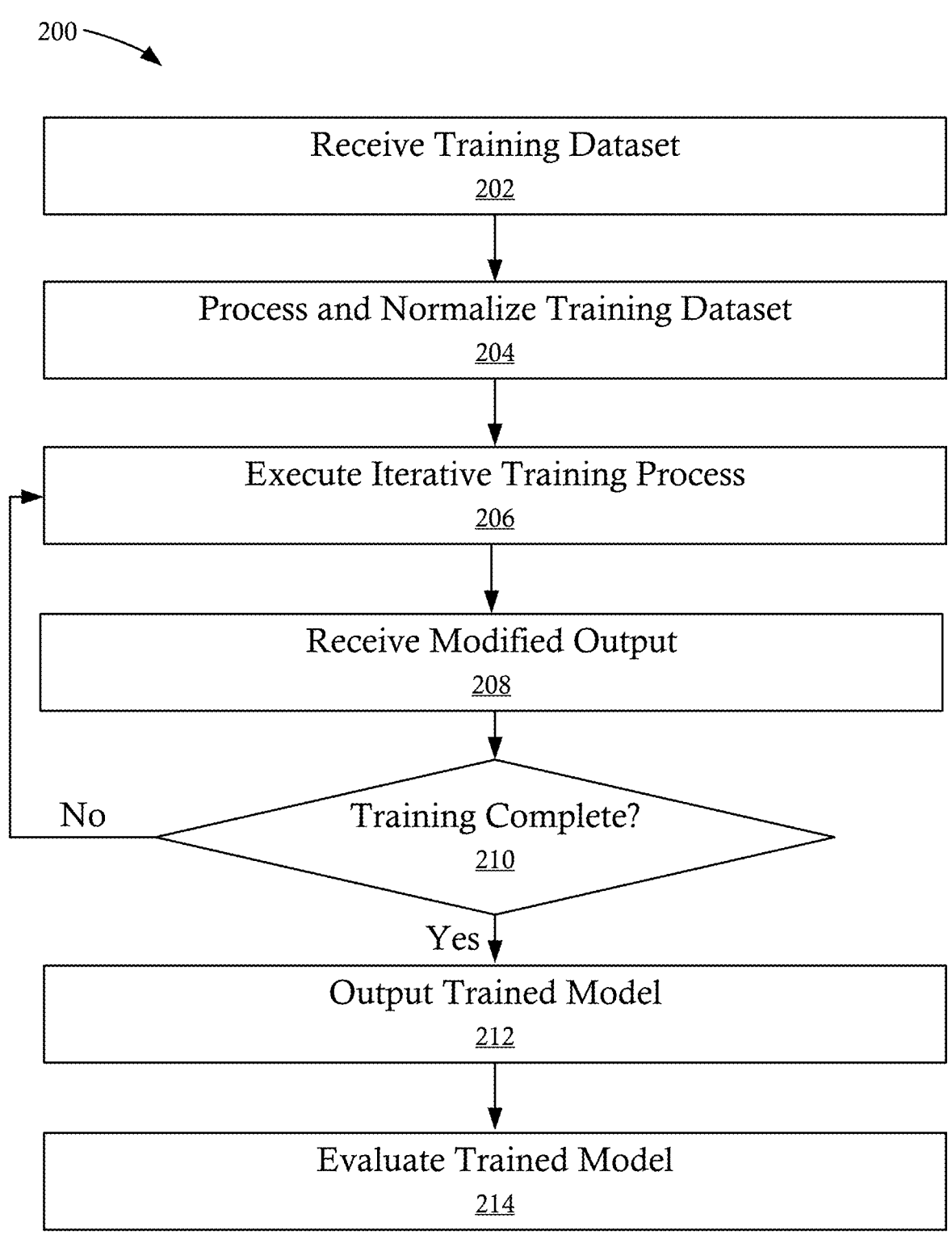
FIG. 11 illustrates a method for generating a trained model, in accordance with some embodiments.
Figure 12:
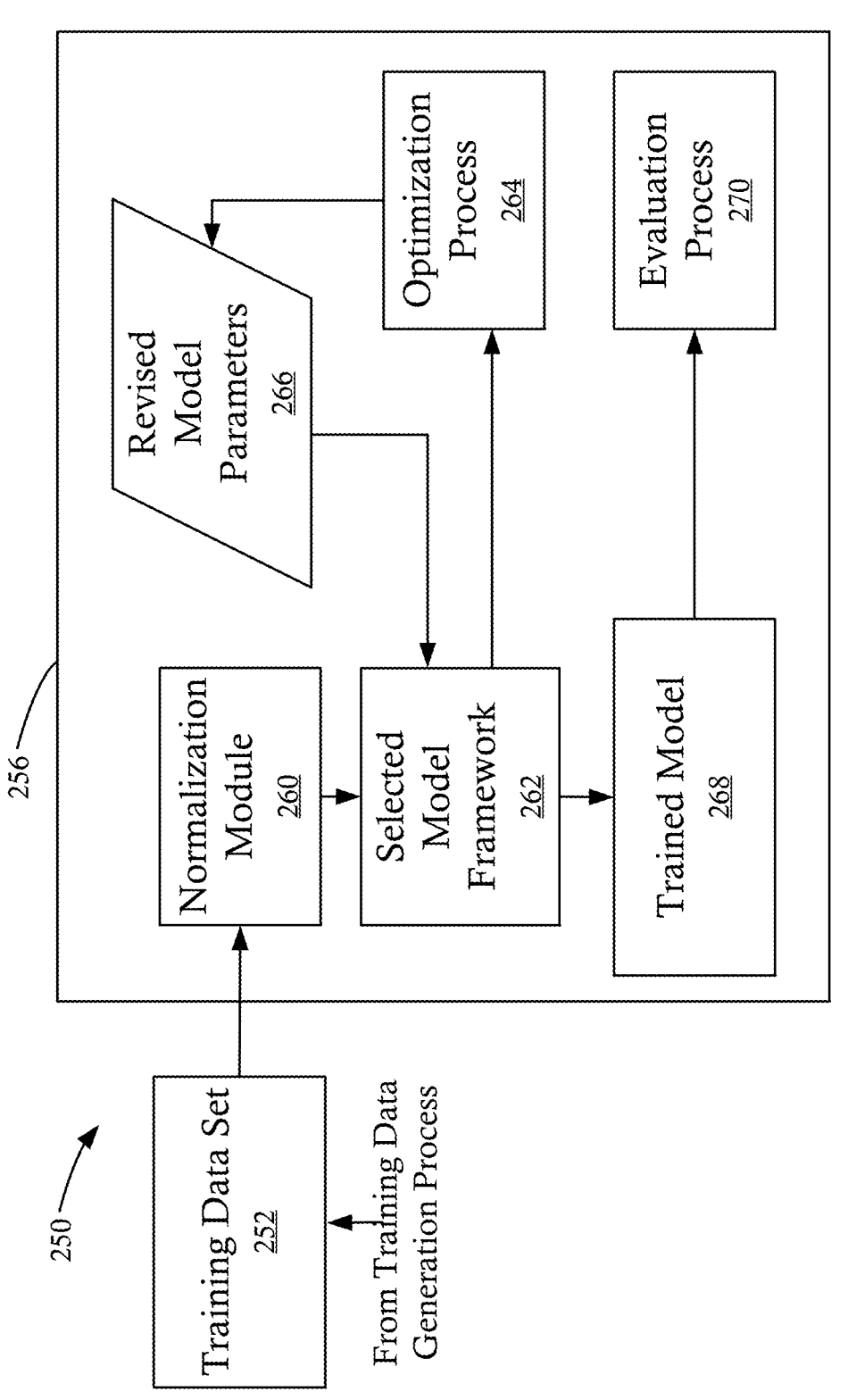
FIG. 12 is a process flow illustrating various steps of the method of generating a trained model, in accordance with some embodiments.

In some embodiments, one or more trained models can be generated using an iterative training process based on a training dataset. FIG. 11 illustrates a method 500 for generating a trained model, in accordance with some embodiments. FIG. 12 is a process flow 550 illustrating various steps of the method 500 of generating a trained model, in accordance with some embodiments. At step 502, a training dataset 552 is received by a system, such as a processing device 10. The training dataset 552 can include labeled and/or unlabeled data.

At optional step 504, the received training dataset 552 is processed and/or normalized by a normalization module 560. For example, in some embodiments, the training dataset 552 can be augmented by imputing or estimating missing values of one or more features associated with a relevant model input. In some embodiments, processing of the received training dataset 552 includes outlier detection configured to remove data likely to skew training. In some embodiments, processing of the received training dataset 552 includes removing features that have limited value with respect to training.

At step 506, an iterative training process is executed to train a selected model framework 562. The selected model framework 562 can include an untrained (e.g., base) machine learning model and/or a partially or previously trained model (e.g., a prior version of a trained model). The training process is configured to iteratively adjust parameters (e.g., hyperparameters) of the selected model framework 562 to minimize a cost value (e.g., an output of a cost function) for the selected model framework 562.

The training process is an iterative process that generates set of revised model parameters 566 during each iteration. The set of revised model parameters 566 can be generated by applying an optimization process 564 to the cost function of the selected model framework 562. The optimization process 564 can be configured to reduce the cost value (e.g., reduce the output of the cost function) at each step by adjusting one or more parameters during each iteration of the training process.

After each iteration of the training process, at step 508, a determination is made whether the training process is complete. The determination at step 508 can be based on any suitable parameters. For example, in some embodiments, a training process can complete after a predetermined number of iterations. As another example, in some embodiments, a training process can complete when it is determined that the cost function of the selected model framework 562 has reached a minimum, such as a local minimum and/or a global minimum.

At step 510, a trained model 568 is output and provided for use in a method of automatically generating interface elements based on natural language prompts for domain-specific data as discussed above. At optional step 512, a trained model 568 can be evaluated by an evaluation process 570. A trained model can be evaluated based on any suitable metrics, such as, for example, an F or F1 score, normalized discounted cumulative gain (NDCG) of the model, mean reciprocal rank (MRR), mean average precision (MAP)

score of the model, and/or any other suitable evaluation metrics. Although specific embodiments are discussed herein, it will be appreciated that any suitable set of evaluation metrics can be used to evaluate a trained model.

Although the subject matter has been described in terms of exemplary embodiments, it is not limited thereto. Rather, the appended claims should be construed broadly, to include other variants and embodiments, which may be made by those skilled in the art.

What is claimed is:

1. A computer-implemented method for generating user interfaces including automatically generated visual interface elements and linkages, comprising:

receiving, from a user at a user chat window, a data request including a first natural language prompt;

in response to receiving the data request, converting the first natural language prompt to a query in a predetermined query language using a first model;

executing a data search based on the query in the predetermined query language, wherein the data search is executed in at least one predetermined database;

identifying at least one visual interface element template based on the query in the predetermined query language using a second model;

generating a visual interface element using a trained generative model that receives a result of the data search based on the query and the at least one visual interface element template, wherein the visual interface element illustrates a plurality of data elements identified by the data search;

generating an interface including the visual interface element;

displaying the interface to the user at the user chat window, wherein the interface is displayed as a first reply to the user;

after displaying the interface, receiving a source request from the user at the user chat window comprising a second natural language prompt, wherein the second natural language prompt identifies at least one data element represented in the visual interface element;

applying a trained source identification model configured to receive the source request and the result of the data search and identify the at least one data element in the at least one predetermined database;

updating the interface to include an interface element representative of an output of the trained source identification model, wherein the updated interface provides additional context in response to the second natural language prompt; and displaying the updated interface to the user at the user chat window, wherein the updated interface is displayed as a second reply to the user.

2. The computer-implemented method of claim 1, wherein the predetermined query language includes SQL.

3. The computer-implemented method of claim 1, wherein the visual interface element includes a graphical interface element.

4. The computer-implemented method of claim 1, wherein the data search is generated by a conversion engine including a natural language processing model configured to convert the natural language prompt to the query.

5. The computer-implemented method of claim 1, wherein the data request is received by one of a chat process or a voice-based process.

6. The computer-implemented method of claim 1, wherein the trained generative model is configured to select a format of the visual interface element based on the at least one data element.

7. The computer-implemented method of claim 1, wherein the interface element representative of the output of the trained source identification model is representative of data structure stored in the at least one predetermined database.

8. A system for generating user interfaces including automatically generated visual interface elements and linkages, comprising:

a non-transitory memory;

a processor communicatively coupled to the non-transitory memory, wherein the processor is configured to read a set of instructions to:

receive, from a user at a user chat window, a data request including a first natural language prompt;

in response to receiving the data request, convert the first natural language prompt to a query in a predetermined query language;

execute a data search based on the query in the predetermined query language, wherein the data search is executed in at least one predetermined database;

identify at least one visual interface element template based on the query in the predetermined query language using a second model;

generate a visual interface element using a trained generative model that receives a result of the data search based on the query and the at least one visual interface element template, wherein the visual interface element illustrates a plurality of data elements identified by the data search;

generate an interface including the visual interface element;

display the interface to the user at the user chat window, wherein the interface is displayed as a first reply to the user;

after displaying the interface, receive a source request from the user at the user chat window comprising a second natural language prompt, wherein the second natural language prompt identifies at least one data element represented in the visual interface element;

apply a trained source identification model configured to receive the source request and the result of the data search and identify the at least one data element in the at least one predetermined database;

update the interface to include an interface element representative of an output of the trained source identification model, wherein the updated interface provides additional context in response to the second natural language prompt; and display the updated interface to the user at the user chat window, wherein the updated interface is displayed as a second reply to the user.

9. The system of claim 8, wherein the predetermined query language includes SQL.

10. The system of claim 8, wherein the visual interface element includes a graphical interface element.

11. The system of claim 8, wherein the data search is generated by a conversion engine including a natural language processing model configured to convert the natural language prompt to the query.

12. The system of claim 8, wherein the data request is received by one of a chat process or a voice-based process.

13. The system of claim 8, wherein the trained generative model is configured to select a format of the visual interface element based on the at least one data element.

14. The system of claim 8, wherein the interface element representative of the output of the trained source identification model is representative of data structure stored in the at least one predetermined database.

15. A non-transitory computer readable medium having instructions stored thereon, wherein the instructions, when executed by at least one processor, cause at least one device to perform operations comprising:

receiving, from a user at a user chat window, a data request including a first natural language prompt;

in response to receiving the data request, converting the first natural language prompt to a query in a predetermined query language;

executing a data search based on the query in the predetermined query language, wherein the data search is executed in at least one predetermined database;

identifying at least one visual interface element template based on the query in the predetermined query language using a second model;

generating a visual interface element using a trained generative model that receives a result of the data search based on the query and the at least one visual interface element template, wherein the visual interface element illustrates a plurality of data elements identified by the data search;

generating an interface including the visual interface element;

displaying the interface to the user at the user chat window, wherein the interface is displayed as a first reply to the user;

after displaying the interface, receiving a source request from the user at the user chat window comprising a second natural language prompt, wherein the second natural language prompt identifies at least one data element represented in the visual interface element;

applying a trained source identification model configured to receive the source request and the result of the data search and identify the at least one data element in the at least one predetermined database;

updating the interface to include an interface element representative of an output of the trained source identification model, wherein the updated interface provides additional context in response to the second natural language prompt; and displaying the updated interface to the user at the user chat window, wherein the updated interface is displayed as a second reply to the user.

16. The non-transitory computer readable medium of claim 15, wherein the visual interface element includes a graphical interface element.

17. The non-transitory computer readable medium of claim 15, wherein the data search is generated by a conversion engine including a natural language processing model configured to convert the natural language prompt to the query.

18. The non-transitory computer readable medium of claim 15, wherein the data request is received by one of a chat process or a voice-based process.

19. The non-transitory computer readable medium of claim 15, wherein the trained generative model is configured to select a format of the visual interface element based on the at least one data element.

20. The non-transitory computer readable medium of claim 15, wherein the interface element representative of the output of the trained source identification model is representative of data structure stored in the at least one predetermined database.

* * * * *